(12) United States Patent
Tsukagoshi

(10) Patent No.: US 8,208,079 B2
(45) Date of Patent: Jun. 26, 2012

(54) OPTICAL COMPENSATOR, LIQUID CRYSTAL DISPLAY SYSTEM, AND PROJECTION TYPE LIQUID CRYSTAL DISPLAY SYSTEM AND PRODUCTION METHOD AND ADJUSTMENT METHOD OF DISPLAY SYSTEM

(75) Inventor: Tomonori Tsukagoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 184 days.

(21) Appl. No.: 12/280,755

(22) PCT Filed: Dec. 28, 2007

(86) PCT No.: PCT/JP2007/075248
§ 371 (c)(1),
(2), (4) Date: Dec. 10, 2008

(87) PCT Pub. No.: WO2008/081919
PCT Pub. Date: Jul. 10, 2008

(65) Prior Publication Data
US 2009/0244412 A1    Oct. 1, 2009

(30) Foreign Application Priority Data
Dec. 28, 2006    (JP) ................................ 2006-355773

(51) Int. Cl.
*G02F 1/13363*    (2006.01)
*G02F 1/1335*    (2006.01)
*G02F 1/13*    (2006.01)
(52) U.S. Cl. ............................ 349/8; 349/119; 349/187
(58) Field of Classification Search .......................... None
See application file for complete search history.

(56) References Cited

U.S. PATENT DOCUMENTS
2003/0103182 A1 *   6/2003   Mi et al. ......................... 349/130
2006/0215091 A1 *   9/2006   Muramoto et al. ........... 349/117

FOREIGN PATENT DOCUMENTS
JP    2002-207125    7/2002
JP    2006-011298    1/2006
JP    2006-09869     4/2006

OTHER PUBLICATIONS
International Search Report dated Apr. 1, 2008.
* cited by examiner

*Primary Examiner* — Sarah Hahm
(74) *Attorney, Agent, or Firm* — SNR Denton US LLP

(57) ABSTRACT

An optical compensator handling higher luminance, capable of achieving a higher contrast ratio while suppressing variation of the contrast ratio, and able to achieve higher definition and longer service life, a liquid crystal display system and a projection type liquid crystal display system using this optical compensator, and a production method and an adjustment method of the display systems are provided. The liquid crystal display system has a liquid crystal device optically modulating an emitted light beam by a liquid crystal layer vertically aligning liquid crystal molecules having negative dielectric constant anisotropies and having a pretilt in a direction vertical to a main surface of a substrate, a first polarizer arranged on an incident side of the liquid crystal device, a second polarizer arranged on an emission side of the liquid crystal device, and an optical compensator arranged in a light path between the emission side of the first polarizer and the incident side of the second polarizer. The optical compensator has at least two compensation layers, the compensation layers being bonded to each other so that the phase difference values and in-plane optical axis directions are different from each other.

12 Claims, 20 Drawing Sheets

FIG. 1
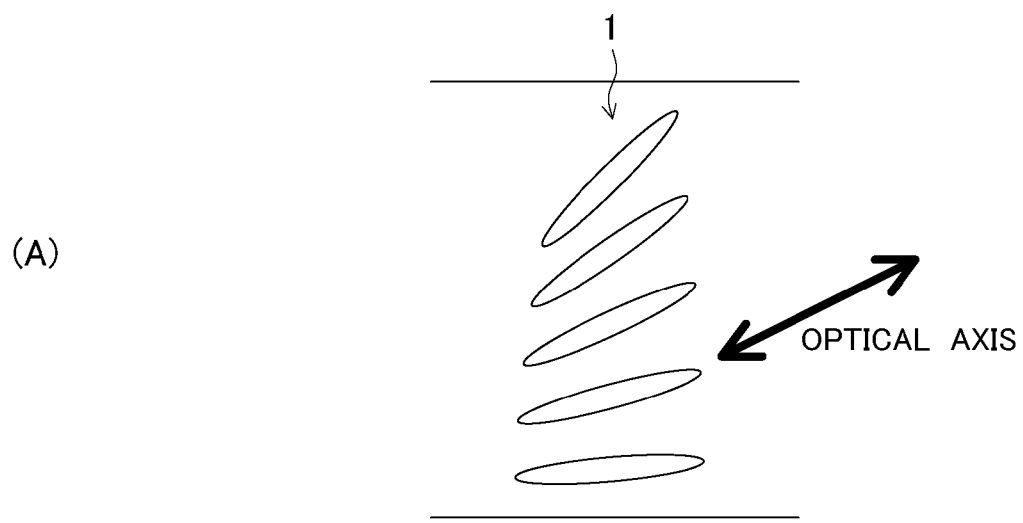
(A)
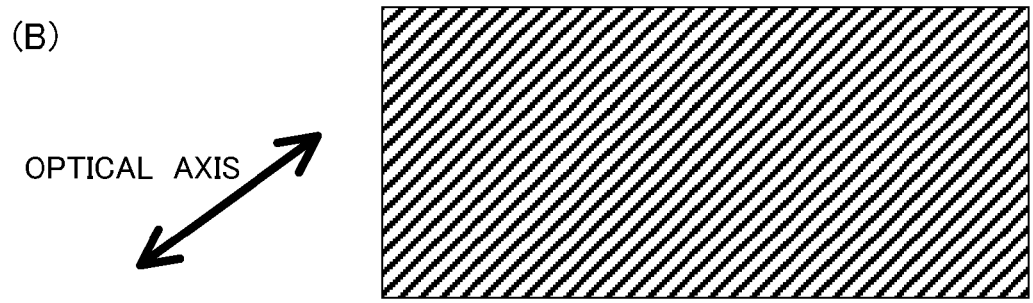
(B)

FIG. 7
 POLARIZER
 PRE-POLARIZER
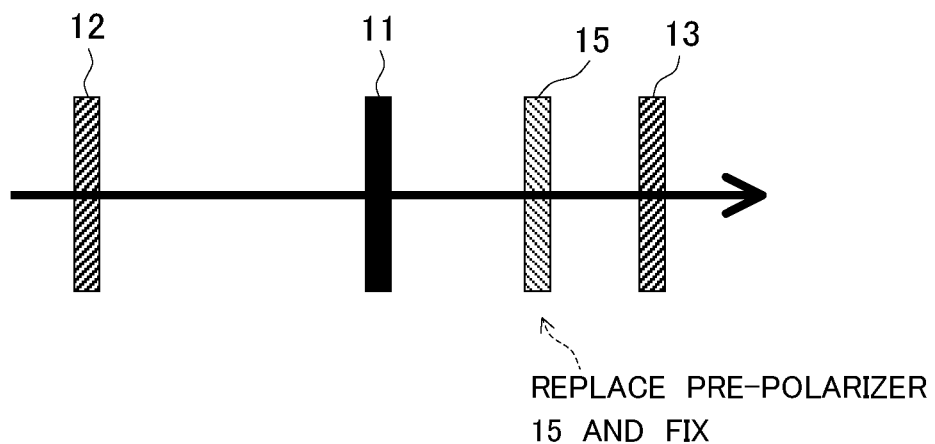
REPLACE PRE-POLARIZER 15 AND FIX
LIQUID CRYSTAL DEVICE:11
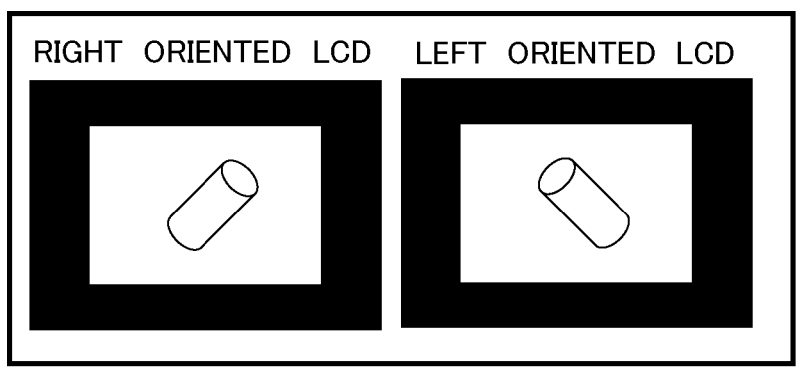

FIG. 11
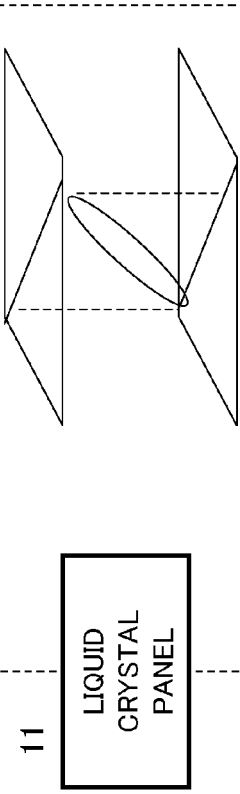
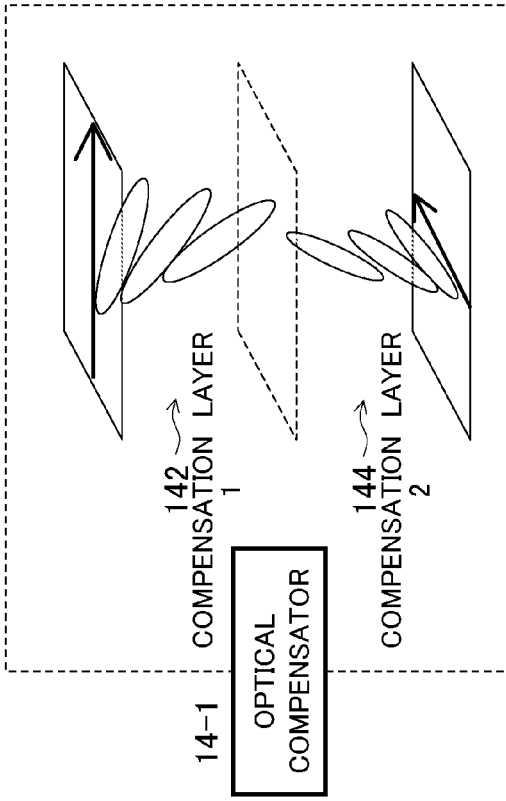
(A) PATTERN 1     (B) PATTERN 2

FIG. 12
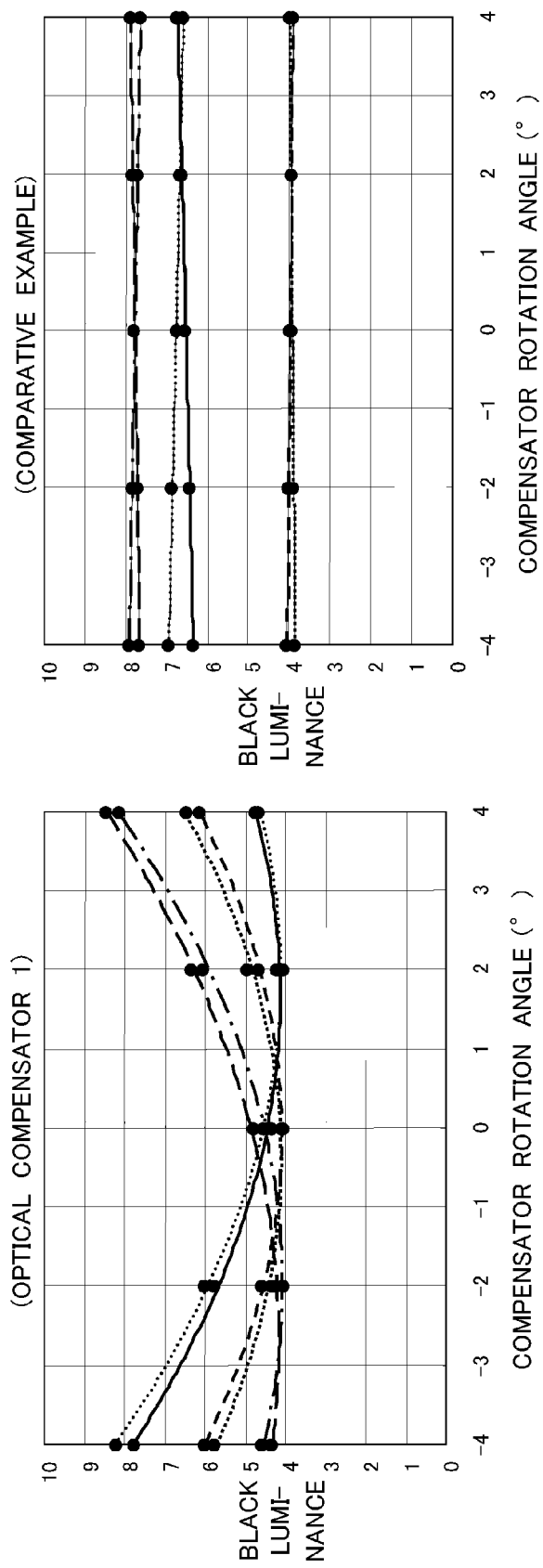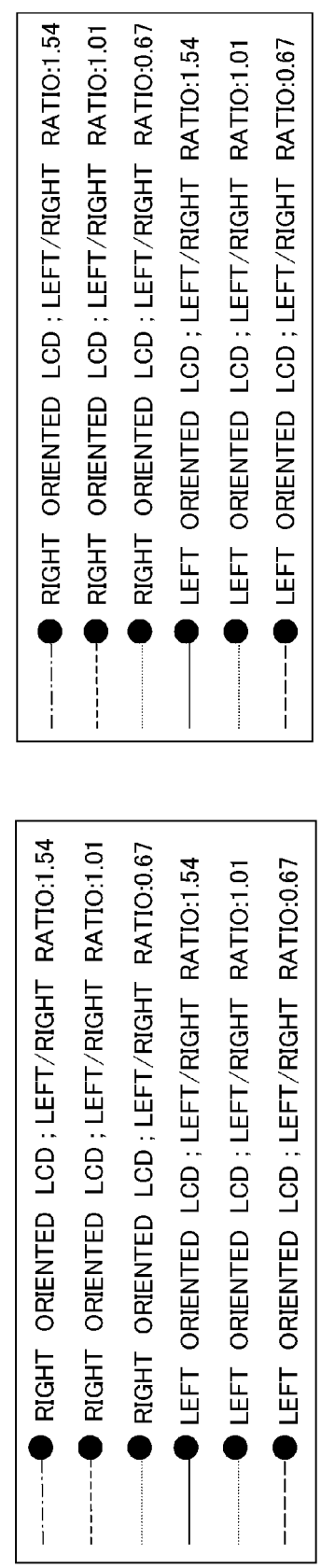

FIG. 16
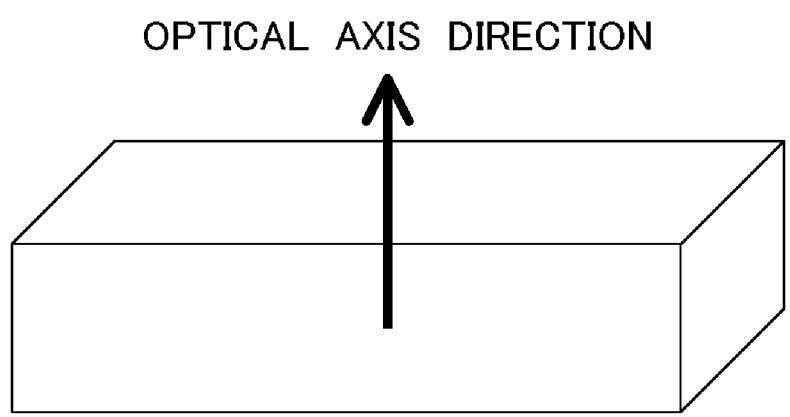
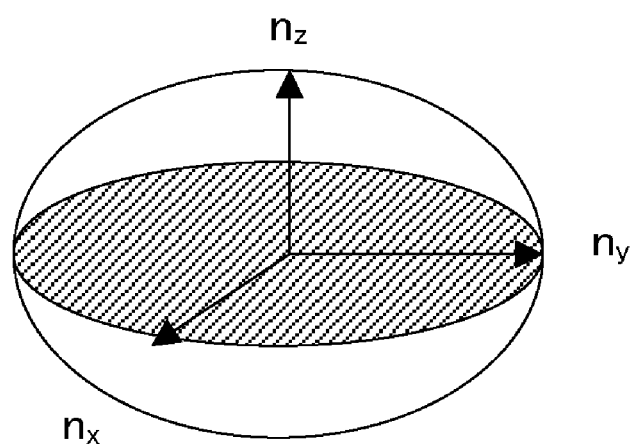
$n_z > n_x = n_y$

FIG. 17
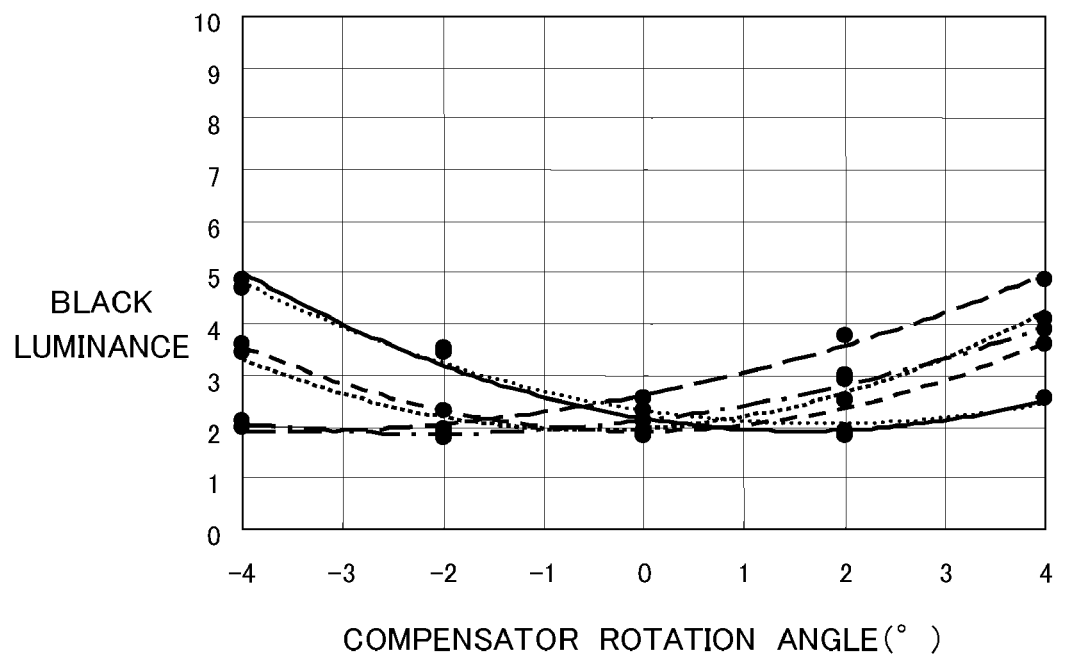
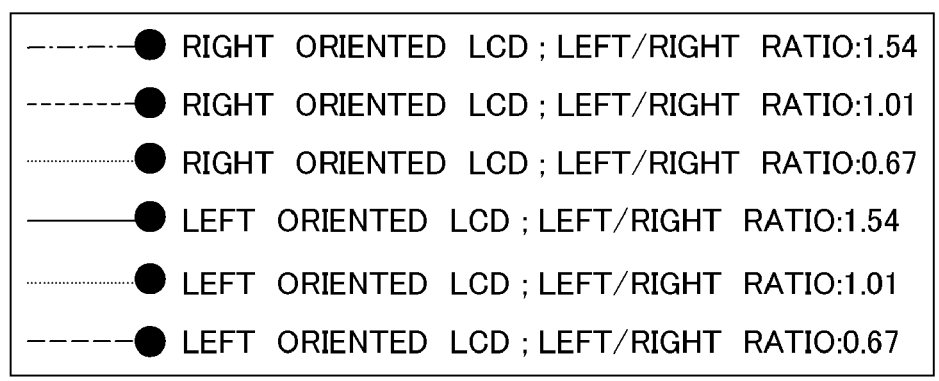

FIG. 18
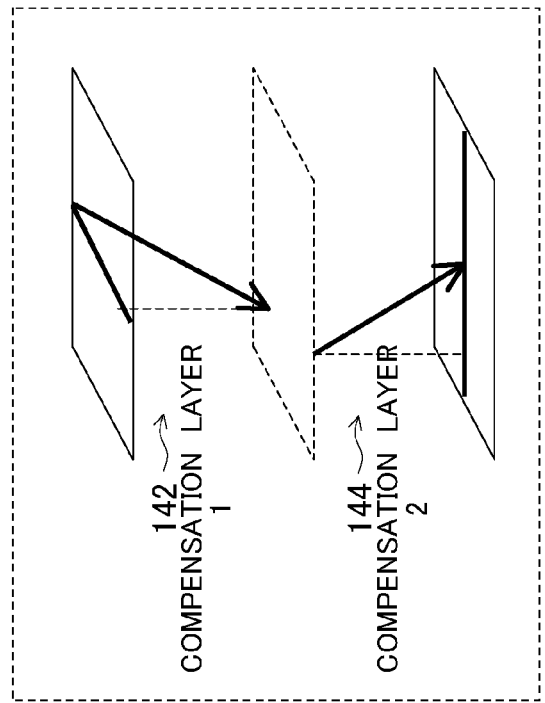
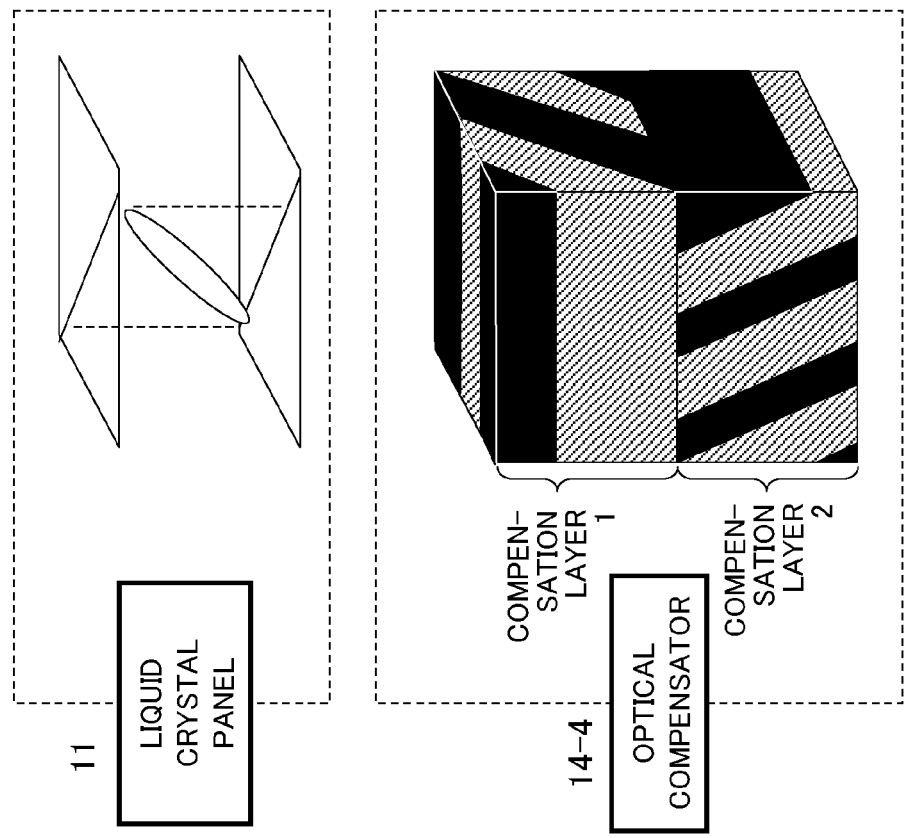

OPTICAL COMPENSATOR, LIQUID CRYSTAL DISPLAY SYSTEM, AND PROJECTION TYPE LIQUID CRYSTAL DISPLAY SYSTEM AND PRODUCTION METHOD AND ADJUSTMENT METHOD OF DISPLAY SYSTEM

TECHNICAL FIELD

The present invention relates to an optical compensator applied to a liquid crystal display system or other display system, a display system and a projection type liquid crystal display system to which this optical compensator is applied, and a production method and an adjustment method of these display systems.

BACKGROUND ART

For example, in a transmission type liquid crystal projector system, light emitted from a light source is split into beams of red, green, and blue, the different color beams are modulated in accordance with image information or image signals by three light valves configured by liquid crystal display devices (hereinafter referred to as "LCD devices"), and the modulated color beams are combined and projected the same onto a projection surface in an enlarged image.

As a light valve mounted in a liquid crystal projector etc., generally, an active matrix drive type LCD device driven by thin film transistors (hereinafter referred to as TFTS), is used.

As an LCD device of an active matrix drive system, a twisted nematic (TN type) LCD device having a molecular alignment twisted by 90 degrees will be described.

In this TN type LCD device, as an optical modulation element, a TN type liquid crystal light valve is used. Optical modulation becomes possible by using an incident side polarizer and an emission side polarizer which are arranged so as to sandwich the light value.

The incident side polarizer and the emission side polarizer control the polarization direction of light incident upon the liquid crystal light valve and, at the same time, these polarizers control the polarization direction of the light beam emitted from the liquid crystal light valve.

The transmission type liquid crystal projector system explained above uses a twisted nematic (TN) mode as the liquid crystal mode of the liquid crystal device. In particular, in recent years, in order to achieve a higher luminance, a higher contrast, a higher definition, and a longer operable life, study of the use of a liquid crystal device operated in a vertical alignment (VA) mode has started (see for example Patent Documents 1 and 2).

Patent Document 1: Japanese Patent Publication (A) No. 2006-11298
Patent Document 2: Japanese Patent Publication (A) No. 2006-98669

DISCLOSURE OF THE INVENTION

Problem to be Solved by the Invention

In a transmission type liquid crystal projector system employing the VA mode explained above, in order to control the orientation of the liquid crystal when switching from a voltage application time (ON time) to a voltage non-application time (OFF time), a pretilt angle is given to the vertical alignment type liquid crystal molecules in a plane in a uniform direction by a liquid crystal alignment film.

In this liquid crystal projector system, however, since the liquid crystal has pretilt, the contrast is lowered. For this reason, the technology disclosed in Patent Document 1 proposes to realize a high contrast by tilting a monoaxial phase film with a negative optical anisotropy and with an optical axis in a direction vertical to a substrate surface, to perform optical compensation.

In the technology disclosed in Patent Document 1, however, a wide space for tilting the monoaxial phase film is required in the projector system. In order to form an image in an optical system having a wide space, it is necessary to make the optical system itself large. As a result, it suffers from the disadvantage that the cost of the liquid crystal projector system rises.

Therefore, Patent Document 2 proposes a method not to tilt the optical compensator, but to use one optical compensator having a negative anisotropy of refractive index or two optical compensators.

In this regard, as a compensator having a negative anisotropy of refractive index described above, Patent Document 2 describes a "WV film (made by FUJIFILM)" using a discotic liquid crystal. However, the film suffers from disadvantage that the light tolerance is weak. Further, in a case of individually positioning two optical compensators, space must be kept between the two optical compensators, as a result, a rise of the cost of the liquid crystal projector system, due to an expansion of the optical system, occurs. Accordingly, it is difficult to obtain an optical compensator excellent in light tolerance and realizing a reduction of space.

In liquid crystal projectors, the mainstream up to now has been the use of a normally white mode TN liquid crystal device. As explained before, however, for achieving higher contrast and longer operable life, this device is being replaced by normally black mode vertical alignment (VA) liquid crystal using an alignment film made of an inorganic material. The use of a normally black mode VA liquid crystal, enables to realize a higher contrast. However, in order to stably realize a further higher contrast, it is found that a new inconvenience is encountered of a remarkable phenomenon of influence of a variation in the black level and large fluctuation of the contrast.

Accordingly, it has been required to provide an optical compensator handling higher luminance, able to achieve a longer service life while suppressing the variation of contrast ratio, realizing a display with a higher contrast, and able to stably obtain a high level image quality.

Further, it has been required to provide a liquid crystal display system and a projection type liquid crystal display system using such optical compensators.

Further, it has been required to provide a production method and an adjustment method of such display systems.

Means for Solving the Problem

According to the present invention, there is provided an optical compensator which is arranged between a first polarizer and a second polarizer together with a vertical alignment liquid crystal layer and compensates for a phase of light which is incident from the first polarizer and emitted from the second polarizer, the optical compensator having at least two compensation layers arranged so that surfaces of the layers face each other, the at least two compensation layers being positioned so that values of phase differences of the compensation and directions of optical axes, corresponding to slow axes or fast axes of materials forming the compensation layers, in the planes of the surfaces of the layers, are different from each other.

Preferably, each of the at least two compensation layers is formed by an O-plate which is formed by hybrid alignment of a liquid crystal polymer and in which the optical axis is in an oblique direction relative to the layer surface.

More preferably, each of the at least two compensation layers is formed by an O-plate which is formed by an oblique vapor deposition and in which the optical axis is located in an oblique direction relative to the layer surface.

More preferably, the optical compensator includes a C-plate having a lower refractive index in the thickness direction compared with the refractive index of the layer surface.

More preferably, the optical compensator includes a C-plate having a lower refractive index in the thickness direction compared with the refractive index of the layer surface.

More preferably, the at least two compensation layers have different film thicknesses.

The inventors of the present application studied the causes for the variation in black level, that is, the fluctuation of the contrast, and consequently found that the contrast greatly fluctuated due to a very small deviation of in-plane phase difference of the TAC (triacetyl cellulose) film used as the protection films etc. of the polarizers and a pre-polarizer. For this reason, it is necessary to correct the in-plane phase differences of the TACs of these polarizers and pre-polarizer to match with the phase difference of the liquid crystal device.

According to the optical compensator of the present invention, by positioning as compensation layers, for example, two or more O-plates changed in phase difference values (for example by bonding them with each other), considering the optical compensator in total, a predetermined in-plane phase difference is generated. Further, that in-plane phase difference may be used to compensate for the phase differences of the TAC films of the polarizers in for example a liquid crystal display system.

Further, by rotating the optical compensator, it becomes possible to change the phase difference value. For example, by setting an angle canceling the phase differences of the TAC films, it becomes possible to correct optical axis deviations of the TAC films. Further, simultaneously, by rotating this optical compensator, it becomes possible to correct deviations from design values of a liquid crystal panel and the optical compensator.

Further, according to the present invention, a liquid crystal display system using the optical compensator described above can be provided. Namely, according to the present invention, there is provided a liquid crystal display system having a liquid crystal device optically modulating a light beam emitted from a liquid crystal layer vertically aligning liquid crystal molecules which have a negative dielectric constant anisotropy and have a pretilt with respect to a direction vertical to a main surface of a substrate, a first polarizer arranged on an incident side of the liquid crystal device, a second polarizer arranged on an emission side of the liquid crystal device, and an optical compensator arranged in a light path between an emission side of the first polarizer and an incident side of the second polarizer, the optical compensator having at least two compensation layers arranged so that surfaces of the layers face each other, the at least two compensation layers being positioned so that values of phase differences of the compensation layers, and directions of optical axes, corresponding to slow axes or fast axes of materials forming the compensation layers, in the planes of the surfaces of the layers, are different from each other.

Preferably, the at least two optical compensators are arranged in the light path between an emission side of the first polarizer and an incident side of the liquid crystal device.

Preferably, the liquid crystal display device includes a rotation portion capable of rotating the optical compensator in the plane of the optical compensator.

Preferably, a third polarizer is arranged between the emission side of the liquid crystal device and the incident side of the second polarizer.

Further, according to the present invention, there is provided a projection type liquid crystal system using the above optical compensator. Namely, according to the present invention, there is provided a projection type liquid crystal display system having a light source, an illumination optical system making the light beam emitted from the light source converge to a required light path, a liquid crystal device optically modulating the light beam from the illumination optical system by a liquid crystal layer vertically aligning liquid crystal molecules which have a negative dielectric constant anisotropy and have a pretilt in the direction vertical to the main surface of the substrate, a projection optical system projecting enlarged the light beam optically modulated by the liquid crystal device, a first polarizer arranged on an incident side of the liquid crystal device, a second polarizer arranged on an emission side of the liquid crystal device, and an optical compensator arranged between the emission side of the first polarizer and the incident side of the second polarizer, the optical compensator having at least two compensation layers arranged so that surfaces of the layers face each other, the at least two compensation layers being positioned so that values of phase of the compensation layers differences and directions of optical axes, corresponding to slow axes or fast axes of materials forming the compensation layers, in the planes of the surfaces of the layers, are different from each other.

Preferably, a third polarizer transmitting light in substantially the same polarization direction as the second polarizer is arranged between the liquid crystal device and the second polarizer.

More preferably, the compensator compensates for the phase of the light forming the light beam which is incident from the first polarizer and emitted from the second polarizer via the liquid crystal device.

More preferably, the first or the second polarizer includes a film-shaped member having a phase difference in the plane through which the light passes.

More preferably, the film-shaped member is formed by triacetyl cellulose (TAC).

More preferably, the projection type liquid crystal display system includes a rotation portion capable of rotating the optical compensator about the optical axis.

Further, according to the present invention, there is provided a production method of a display system having a liquid crystal device optically modulating an emitted light beam by a liquid crystal layer vertically aligning liquid crystal molecules having a negative dielectric constant anisotropy and having a pretilt in a direction vertical to a main surface of the substrate, a first polarizer arranged on an incident side of the liquid crystal device, a second polarizer arranged on an emission side of the liquid crystal device, and an optical compensator including at least two compensation layers arranged so that surfaces of the layers face each other, the production method of a display system comprising a step of forming the optical compensator by positioning the at least two compensation layers so that the phase difference values and directions in planes of surfaces of the layers of the optical axes, corresponding to a fast axes or a slow axes of materials forming the compensation layers, are different from each other, a step of arranging the optical compensator in a light path between an emission side of the first polarizer and an incident side of the second polarizer, and a step of adjusting the phase difference value by rotating the optical compensator about an optical axis.

Further, according to the present invention, there is provided an adjustment method of a display device having a liquid crystal device optically modulating an emitted light beam by a liquid crystal layer vertically aligning liquid crystal molecules having a negative anisotropy of the dielectric constant, a first polarizer arranged on an incident side of the liquid crystal device, a second polarizer arranged on an emission side of the liquid crystal device, and an optical compensator including at least two compensation layers arranged so that surfaces of the layers face each other, the adjustment method of a display device comprising a step of forming the optical compensator by positioning the at least two compensation layers so that the phase difference values and directions in planes of the layer surfaces of the optical axes, corresponding to a fast axes or a slow axes of materials forming the compensation layers are different from each other, a step of arranging the optical compensator in a light path between the emission side of the first polarizer and the incident side of the second polarizer, and a step of adjusting the phase difference value by rotating the optical compensator about the optical axis.

The optical compensator of the present invention can have an in-plane phase difference. Further, when the optical compensator of the present invention is rotated about the optical axis, the in-plane phase difference changes.

The at least two optical compensators constituting the optical compensator of the present invention are thin and, further, are arranged in a state of close contact or proximity, for example, are bonded to each other, therefore the dimensions in the optical axis direction do not substantially increase.

In a display system using the optical compensator of the present invention, for example, a liquid crystal display system or projection type liquid crystal system, it becomes possible to accurately correct deviation of the optical axis in the polarizers, pre-polarizer, etc. by using the optical compensator. As a result, a higher luminance can be handled, a higher contrast can be realized while suppressing the variation of contrast ratios, and high definition and high quality images can be provided. Further, in the liquid crystal display system and projection type liquid crystal display system of the present invention, shortening of the service life due to heat can be prevented.

The production method of a display system using the optical compensator of the present invention, for example, a liquid crystal display system or a projection type liquid crystal display system, is easy.

Further, when using the optical compensator of the present invention, for example, only the optical compensator is rotated, therefore it is easy to adjust the value of the phase difference of the display system.

BRIEF DESCRIPTION OF THE DRAWINGS

FIG. 1 A diagram for explaining an example of the configuration of an O-plate according to an embodiment of the present invention.

FIG. 7 A diagram schematically showing measurement of a "left/right ratio".

FIG. 11 A diagram showing relationships between a tilt direction of a liquid crystal and a rubbing direction of an optical compensator.

FIG. 12 A diagram showing relationships between rotation angles and black luminances when rotating the first optical compensator.

FIG. 16 A diagram showing a refractive index ellipse of a negative C-plate.

FIG. 17 A diagram showing relationships between rotation angles and black luminances when rotating the third optical compensator.

FIG. 18 A diagram showing the structure and a vapor deposition direction of a fourth optical compensator.

BEST MODE FOR CARRYING THE INVENTION

Below, embodiments of the present invention will be explained with reference to the accompanying drawings.

As embodiments of the present invention, two O-plates having positive anisotropies of refractive indexes and a case of arranging those two O-plates in a liquid crystal projector system will be explained.

An O-plate means a plate in which an optical axis corresponding to a fast axis or a slow axis of a material forming a compensation layer thereof and defining a direction not causing birefringence is located in an oblique direction relative to a light transmission surface. As an example of the O-plate, for example, as shown in FIG. 1(A), there is used a plate formed by hybrid aligning a liquid crystal polymer 1. Alternatively, as shown in FIG. 1(B), the O-plate can be fabricated by forming a film of an inorganic material, for example, $S_iO_2$ or $T_iO_2$, by oblique vapor deposition. Here, in a case where the liquid crystal polymer 1 shown in FIG. 1(A) is hybrid aligned, a direction not causing birefringence for an entirety of a plurality of liquid crystal molecules aligned in different directions in the liquid crystal layer is defined as an optical axis corresponding to the fast axis or slow axis.

In a case of individually arranging two optical compensators, space for the compensators becomes necessary, so a rise of cost of the liquid crystal projector system due to the enlargement of the dimensions of the optical system occurs. When arranging two optical compensators in a narrow space while maintaining the current size of the optical system as it is, the heat release properties of the polarizers and pre-polarizer become low, and the service lives of the polarizers and pre-polarizer are lowered. As a result, the service life of the liquid crystal projector system becomes shorter.

In the case of arranging two optical compensators while maintaining the current space as it is, it may be considered to combine the two optical compensators with the liquid crystal panel, pre-polarizer, and polarizers.

However, the operable life of the optical compensator becomes shorter. The reason for that is that the liquid crystal panel, pre-polarizer, and polarizers absorb heat, therefore their temperatures rise, but the optical compensator does not absorb heat, so the rise of the temperature is small. However, when the liquid crystal panel, pre-polarizer, and polarizers raised in their temperatures and the optical compensator are joined, the temperature of the optical compensator rises. As a result, the operable life of the optical compensator becomes shorter.

Figure 2:
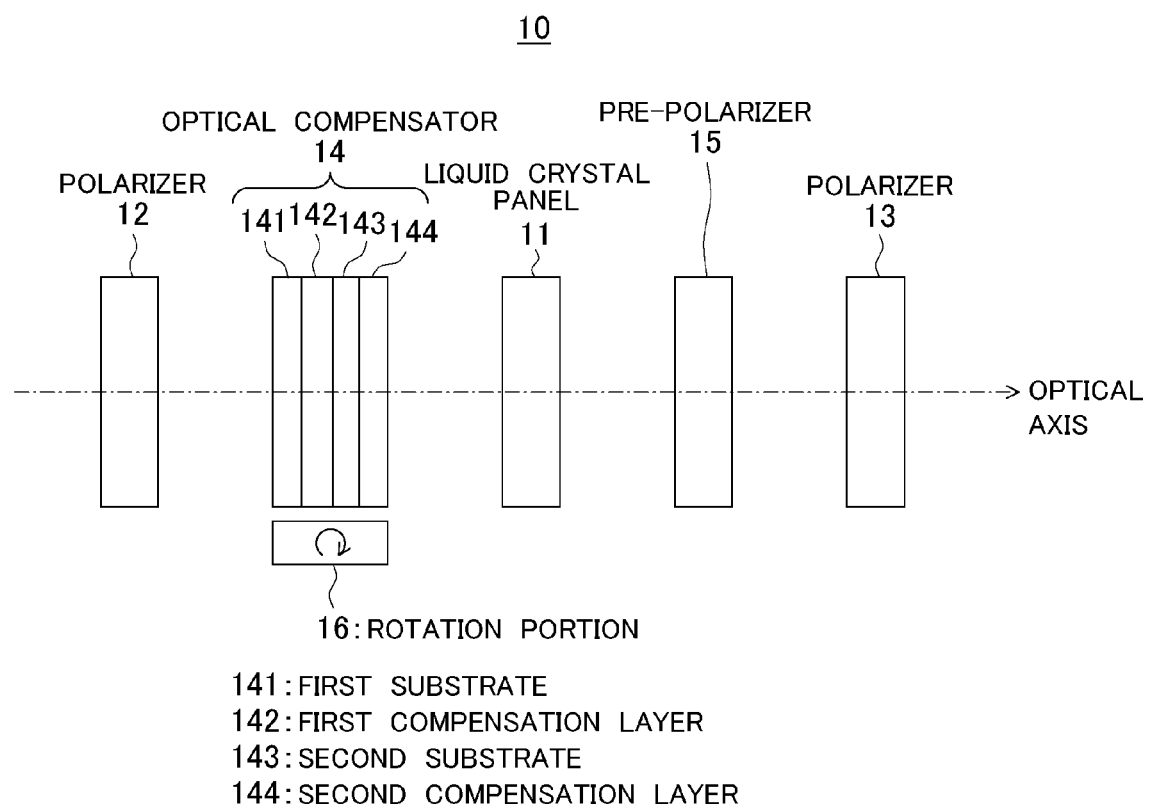
FIG. 2 A diagram showing an example of the configuration of a liquid crystal display system according to an embodiment of the present invention.

FIG. 2 is a diagram showing an example of the configuration of a liquid crystal display device according to an embodiment of the present invention.

A liquid crystal display system 10 according to the present embodiment has a liquid crystal device (liquid crystal panel) 11 optically modulating an emitted light beam at a liquid crystal layer vertically aligning liquid crystal molecules having negative anisotropy of dielectric constants, a first polarizer 12 arranged on an incident side of the liquid crystal device 11, a second polarizer 13 arranged on an emission side of the liquid crystal device 11, an optical compensator 14 arranged between the incident side of the liquid crystal device 11 and the emission side of the first polarizer 12, a pre-polarizer (third polarizer) 15 arranged between the emission side of the liquid crystal device 11 and the incident side of the second polarizer 13, and a rotation mechanism 16 rotatable the optical compensator 14 about the optical axis.

The optical compensator 14 according to the present embodiment is formed by, more concretely, combining a first compensation layer 142 formed on a first substrate 141 and a second compensation layer 144 formed on a second substrate 143, and having a predetermined phase difference from the first compensation layer 142.

The optical compensator 14 is more concretely formed by bonding for example two or more O-plates formed by hybrid aligning the liquid crystal polymer so that the phase difference values and directions of the optical axes in the planes are different from each other.

Alternatively, the optical compensator 14 according to the present embodiment is formed by bonding two or more layers of O-plates formed by oblique vapor deposition layers to each other so that phase difference values and optical axis directions in the planes are different from each other.

The liquid crystal layer of the liquid crystal device (panel) 11 is provided with a C-plate having a pretilt angle in a direction vertical to the main surface of the substrate (for example, the substrate 111 of FIG. 4) and having a negative anisotropy of the refractive indexes.

Note that, as protection films of the polarizers 12 and 13 and pre-polarizer 15, a TAC (triacetyl cellulose) film is used.

The liquid crystal display system 10 having such a configuration uses an optical compensator having a VA mode and combining (preferably bonding) two O-plates having different front surface retardation values and further provides an in-plane rotation mechanism 16 to enable rotation and suppress black unevenness and variation of contrast without raising the cost of the display system.

In the liquid crystal display system 10, due to the above characteristic features, prolongation of the operable life is realized without increasing the number of parts, and correction of the in-plane phase difference with the TAC films of the polarizers and pre-polarizer becomes possible. Further, when bonding two optical compensators to each other, it becomes possible to arrange the two optical compensators while maintaining the current space relation as it is.

By changing the phase difference values of two or more O-plates positioned close to each other, preferably bonded to each other, an in-plane phase difference is caused when considering the optical compensator in total. By rotating the optical compensator 14, it becomes possible to change the value of the phase difference. By setting an angle that cancels the phase differences of the TAC films of the polarizers 12 and 13 and pre-polarizer 15, it becomes possible to correct the optical axis deviations of the in-plane phase differences of the TAC films. Further, by rotating this optical compensator, it becomes possible to correct deviations from design values of the liquid crystal panel and optical compensator as well.

Figure 3:
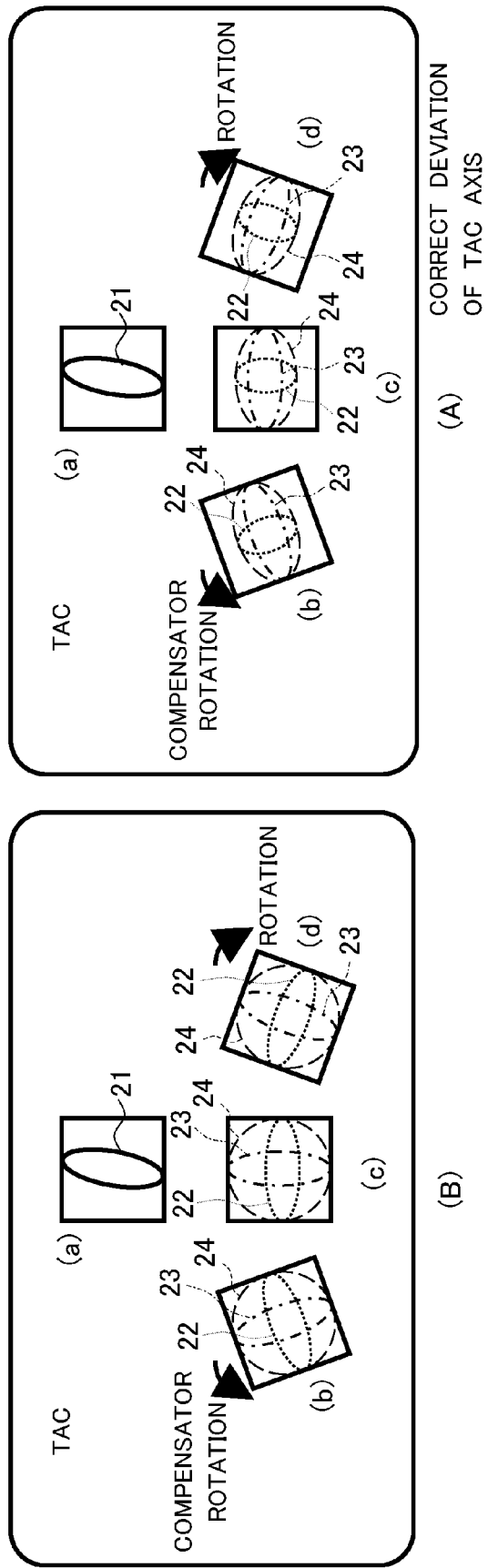
FIG. 3 A conceptual diagram of rotation of an optical compensator according to the present embodiment and a comparative example.

An image of the principle of correcting deviation of an optical axis of the in-plane phase difference of a TAC film is shown in FIG. 3.

FIG. 3(A) is an image of the rotation of an optical compensator where the retardation values of its two compensation layers are different when seen from an advance (forward) direction of the light (direction in which a polar angle is 0 degree) according to the present embodiment, and FIG. 3(B) is a diagram showing an image of the rotation when the retardation values of the two compensation layers are equal as a comparative example.

In FIG. 3, notation 21 indicates a refractive index ellipse of the TAC film, notation 22 indicates a refractive index ellipse of the input side compensation layer 142, notation 23 indicates the refractive index ellipse of the emission side compensation layer 144, and notation 24 indicates the refractive index ellipse of the total optical compensator by the input side compensation layer 142 and emission side compensation layer 144.

When rotating the optical compensator 14 according to the present embodiment rightward or leftward about the optical axis by using the rotation mechanism 16, the change of the refractive index ellipse 24 on the emission side is large. As a result, correction of the axis deviation of the refractive index ellipse of the TAC film becomes possible. For example, in FIG. 3(A), the axis deviation of the refractive index ellipse of the TAC film can be corrected by rotating the optical compensator as indicated by (d) in FIG. 3(A).

Contrary to this, in the comparative example of FIG. 3(B), even when the optical compensator is rotated rightward or leftward about the optical axis, the change of the refractive index ellipse 24 is small. Consequently, correction of the TAC axis deviation is difficult.

Note that, the rotation mechanism 16 will be explained later.

Figure 4:
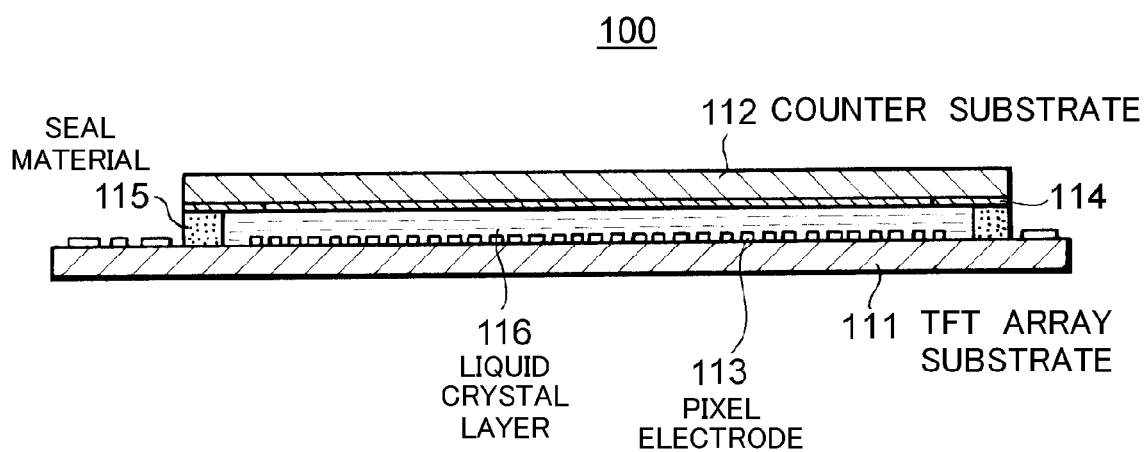
FIG. 4 A sectional view schematically showing the configuration of an active matrix type liquid crystal device according to the present embodiment.

FIG. 4 is a sectional view schematically showing the configuration of an active matrix type liquid crystal device according to the present embodiment used as the liquid crystal device 11.

The liquid crystal device 11 according to the present embodiment is provided with, as shown in FIG. 4, a liquid crystal layer 116, a pixel electrode 113, a liquid crystal compensation layer 114, a TFT array substrate 111, and a transparent counter substrate 112 arranged so as to face the TFT array substrate 111.

The TFT array substrate 111 is formed by, for example, a quartz (quartz glass or silica-base glass) substrate in a case of the transmission type and is formed by a substrate made of for example a silicon material in a case of a reflection type. The counter substrate 112 is formed by, for example, a glass substrate or quartz substrate. The TFT array substrate 111 is provided with a pixel electrode 113 in the case of the transmission type.

The pixel electrode 113 is formed by, for example, an ITO film (indium-tin-oxide film) or other transparent conductive thin film. In the case of the reflection type, as the pixel electrode 113, for example, a reflection electrode made of for example a metal material is used. As the metal material, generally, aluminum as it has a high reflection factor in a visible light region is used. In more detail, an aluminum metal film obtained by adding several wt % of copper or silicon is generally used. Other than this, it is also possible to use, for example, platinum, silver, gold, tungsten, or titanium. On the counter substrate 112, an ITO film 114 is provided.

On the TFT array substrate 111 and counter substrate 112, not shown alignment films for aligning liquid crystals in predetermined directions are formed. A vertical alignment liquid crystal layer 116 is sandwiched (sealed) between the pair of substrates 111 and 112 which are then bonded to each other by a seal material so that their alignment films face each other across a predetermined clearance.

Figure 5:
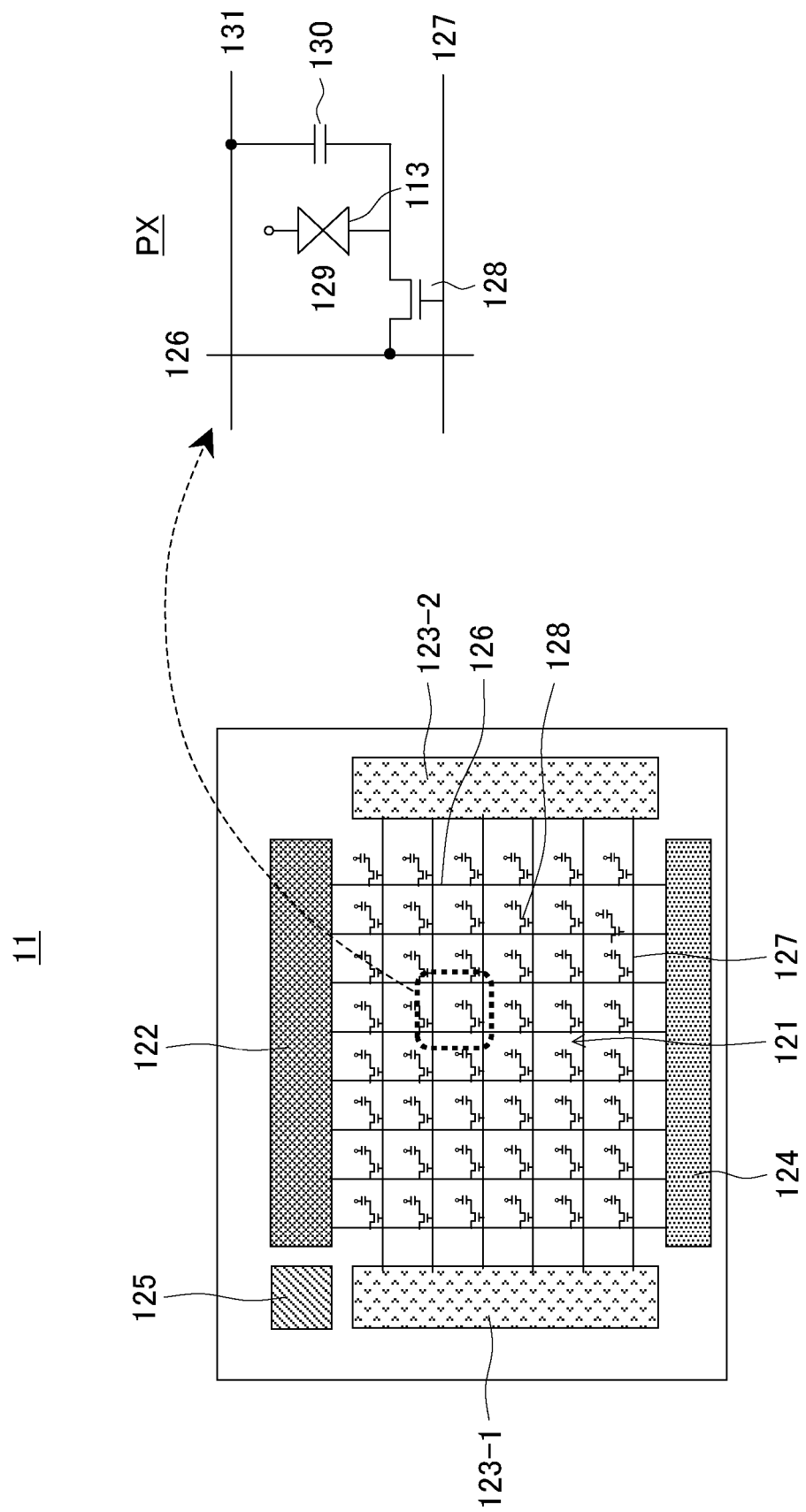
FIG. 5 A diagram showing an example of an arrangement in an array substrate (liquid crystal panel portion) of an active matrix type liquid crystal device according to the present embodiment.

FIG. 5 is a diagram showing an example of the arrangement in the array substrate (liquid crystal panel portion) of the active matrix type liquid crystal device according to the present embodiment.

As shown in FIG. 5, the liquid crystal device 11 includes a pixel display region 121 having pixels arranged in an array, a horizontal transfer circuit 122, vertical transfer circuits 123-1 and 123-2, a pre-charge circuit 124, and a level conversion circuit 125.

In the pixel display region 121, a plurality of data lines 126 and a plurality of scanning lines (gate interconnects) 127 are arranged in a lattice state. A first end side of each data line 126 is connected to the horizontal transfer circuit 122, the other end side is connected to the pre-charge circuit 124, and the end portion of each scanning line 127 is connected to the vertical transfer circuits 123-1 and 123-2.

In each of a plurality of pixels PX formed in a matrix constituting the pixel display region 121 of the liquid crystal display device 11, a transistor 128 performing switching control, a liquid crystal element 129, and an auxiliary capacitor (storage capacitor) 130 are provided.

A data line 126 supplied with data signals is electrically connected to the source of the transistor 128 and supplies pixel signals for writing. Further, the configuration is made so that the scanning line 127 is electrically connected to the gate of the transistor 128, and scanning signals are pulse-wise supplied to the scanning line 127 at a predetermined timing.

The pixel electrode 113 is electrically connected to the drain of the transistor 128. By turning on the switch of the switching element configured by the transistor 128 for exactly a constant period, the pixel signal supplied from the data line 126 is written into the liquid crystal element 129 at a predetermined timing.

The predetermined level pixel signal supplied to the liquid crystal element 129 via the pixel electrode 113 is held for a constant period by a liquid crystal capacitor formed between a counter electrode formed on the counter substrate 112 and the pixel electrode 113. The liquid crystal element 129 modulates the light and enables display of gradations by the change of the alignment or order of groups of molecules according to the applied voltage level.

In the case of a normally white display, when the incident light passes through this liquid crystal portion, the amount of light blocked is controlled in accordance with the applied voltage. As a whole, light having a contrast in accordance with the pixel signal is emitted from the liquid crystal device 11.

In order to prevent the held pixel signal from being leaked here, an auxiliary capacitor (storage capacitor) 130 is added parallel to the liquid crystal capacitor formed between the pixel electrode 113 and the counter electrode 112. Due to this, the holding characteristic is further enhanced, and a liquid crystal device 11 having a high contrast ratio can be realized.

In order to form the auxiliary capacitor (storage capacitor) 130, a common interconnect 131 formed into a resistor is provided.

The liquid crystal device 11 of the present embodiment is configured as for example an active matrix type liquid crystal display device performing frame inversion drive inverting the voltage applied to each pixel electrode for each frame with the same polarity.

Figure 6:
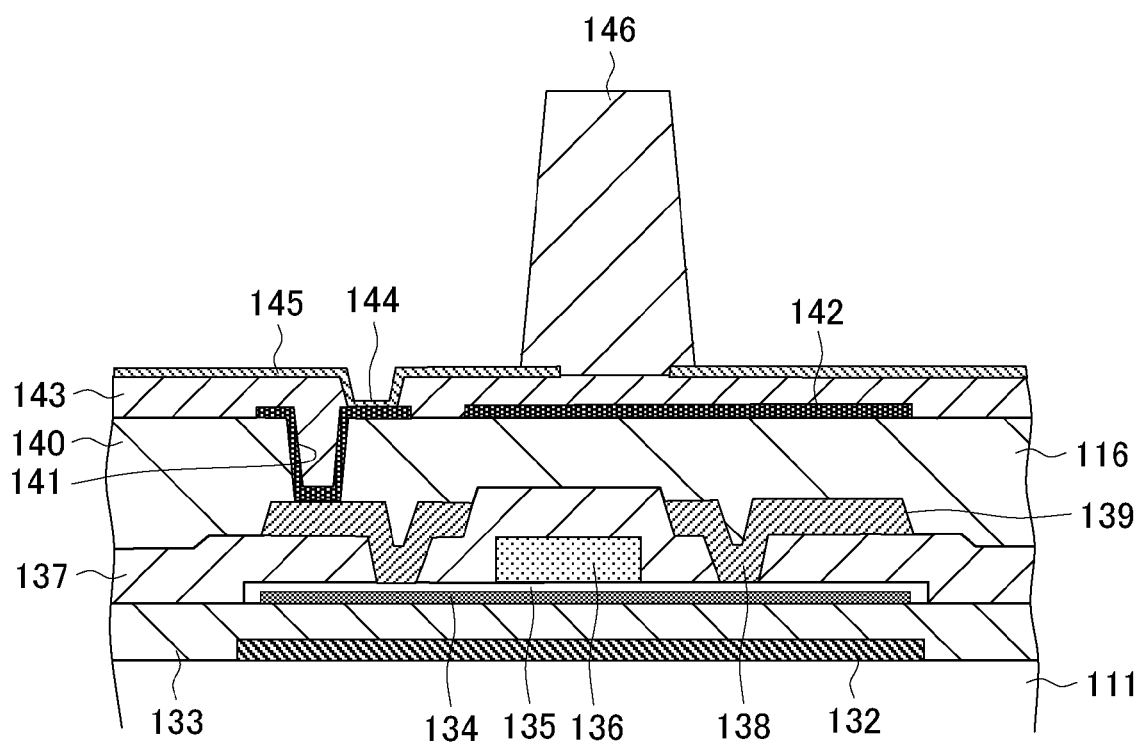
FIG. 6 A sectional view showing an example of a concrete configuration of a TFT array substrate side of the active matrix type liquid crystal device according to the present embodiment.

FIG. 6 is a sectional view showing a concrete example of the configuration of the TFT array substrate side of an active matrix type liquid crystal device according to the present embodiment.

This liquid crystal device 11 has a TFT array substrate 111, a first light blocking film 132 formed on the TFT array substrate 111, a first interlayer film 133 formed on the TFT array substrate 111 and the first light blocking film 132, a polycrystalline Si film (p-Si) 134 formed on the first interlayer film 133, a gate insulation film 135 formed on the polycrystalline Si film (p-Si) 134, a gate electrode 136 formed on the gate insulation film 135, a second interlayer film 137, gate insulation film 135, and gate electrode 136 formed on the first interlayer film 133, a first contact 138 formed on the second interlayer film 137, a first interconnect film 139 formed while including an interior of the first contact 138, a third interlayer film 140 formed on the second interlayer film 137 and first interconnect film 139, a second contact 141 formed on the third interlayer film 140, a second light blocking film 142 formed on the third interlayer film 140 while including the interior of the second contact 141 and having conductivity, a fourth interlayer film 143 formed on the third interlayer film 140 and second light blocking film 142, a third contact 144 formed in the fourth interlayer film 143, a transparent electrode 145 selectively formed on the fourth interlayer film 143 while including the interior of the third contact 144, and a column-shaped spacer 146 formed on the transparent electrode 145 and fourth interlayer film 143.

Although not shown in FIG. 6, as explained in relation to FIG. 4, on the TFT array substrate 111 and counter substrate 112, not shown alignment films are formed in order to align the liquid crystal in predetermined directions. The vertical alignment liquid crystal layer 116 is sandwiched (sealed) between the pair of substrates 111 and 112 bonded to each other by the seal material 115 so that the alignment films face each other across a predetermined clearance.

Below, a concrete embodiment of a liquid crystal display system having the above configuration will be explained. The following explanation includes the procedure for confirming the effects in a case where the optical compensator as the embodiment is applied and the measurement results. At the time of production, when the optical compensator is applied to a projection type display system, measurement of the contrast ratio in the later explained case where the optical compensator is not applied and measurement for quantification of the optical axis deviation of the in-plane phase difference of the TAC films are not necessary. It is self-evident that at least a predetermined level of contrast ratio is obtained by applying adjusted optical compensators to individual projection type display systems.

(Fabrication of Liquid Crystal Panel)

A liquid crystal panel containing a vertical alignment type liquid crystal material with a positive anisotropy of the refractive index and a negative dielectric constant anisotropy is fabricated. At that time, this panel has a predetermined cell gap d so that a relative index Δn and a cell gap d becomes Δn·d=390 (nm). Further, for example, this has an alignment film formed by the oblique vapor deposition process. By controlling a vapor deposition angle and a vapor deposition orientation, a predetermined tilt angle can be obtained in a predetermined orientation.

(Measurement of Left/Right Ratio of Pre-polarizer)

Further, as a method of quantifying the axis deviation of the TAC film used as the protection film of the pre-polarizer 15, the term "left/right ratio" will be defined.

FIG. 7 is a diagram schematically showing the measurement of the "left/right ratio".

In the "left/right ratio", black luminances are measured by using two liquid crystal panels obtained by the vapor deposition of alignment films from a direction rotated rightward at 45° and a direction rotated leftward at 45° (hereinafter successively called a "right oriented LCD" and a "left oriented LCD"). The "left/right ratio" is found from the following equation:

"Left/right ratio"=(black luminance of right oriented LCD)/(black luminance of left oriented LCD).

At that time, a plurality of pre-polarizers 15 having different polarization characteristics are used to measure this "left/right ratio".

Figure 8:
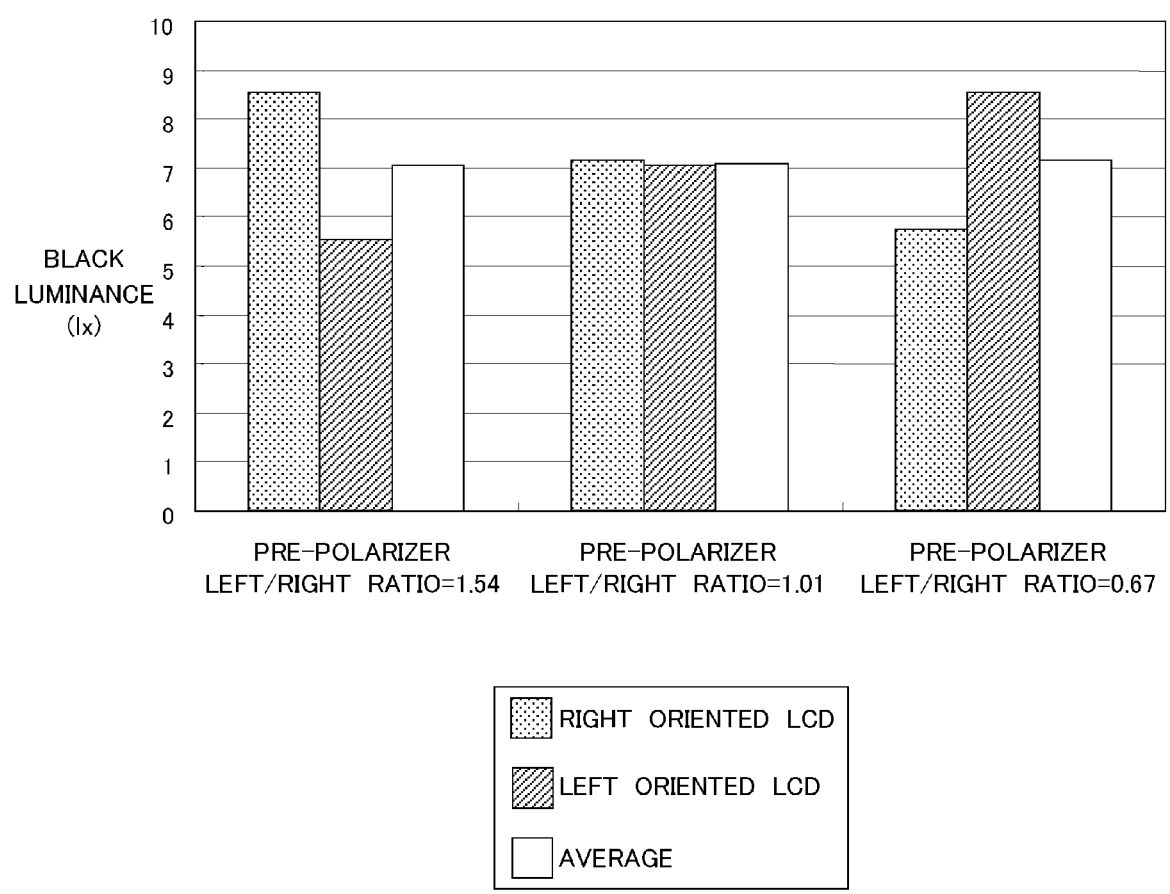
FIG. 8 A diagram showing left/right ratio measurement results of a pre-polarizers.

FIG. 8 is a diagram showing the left/right ratio measurement results of the pre-polarizers.

In the pre-polarizers 1, 2, and 3, the mean values of the black luminances of the right oriented LCD and the left oriented LCD are substantially equal, but the "left/right ratios" greatly differ. This is because of the optical axis deviations of the in-plane phase difference values of the TAC films of the pre-polarizers. Due to the alignment direction of the liquid crystal device and relative in-plane optical axis deviation directions of the TAC films of the pre-polarizers, the contrast rises or becomes lower. As a result, when combining the three plates, the problem arises of great fluctuation of the black chromaticity.

These three pre-polarizers are used to measure the contrast.

(Projection System for Contrast Measurement)

Next, the contrast is measured by using optical compensators and pre-polarizers having different left/right ratios of the present embodiment and a comparative example.

Figure 9:
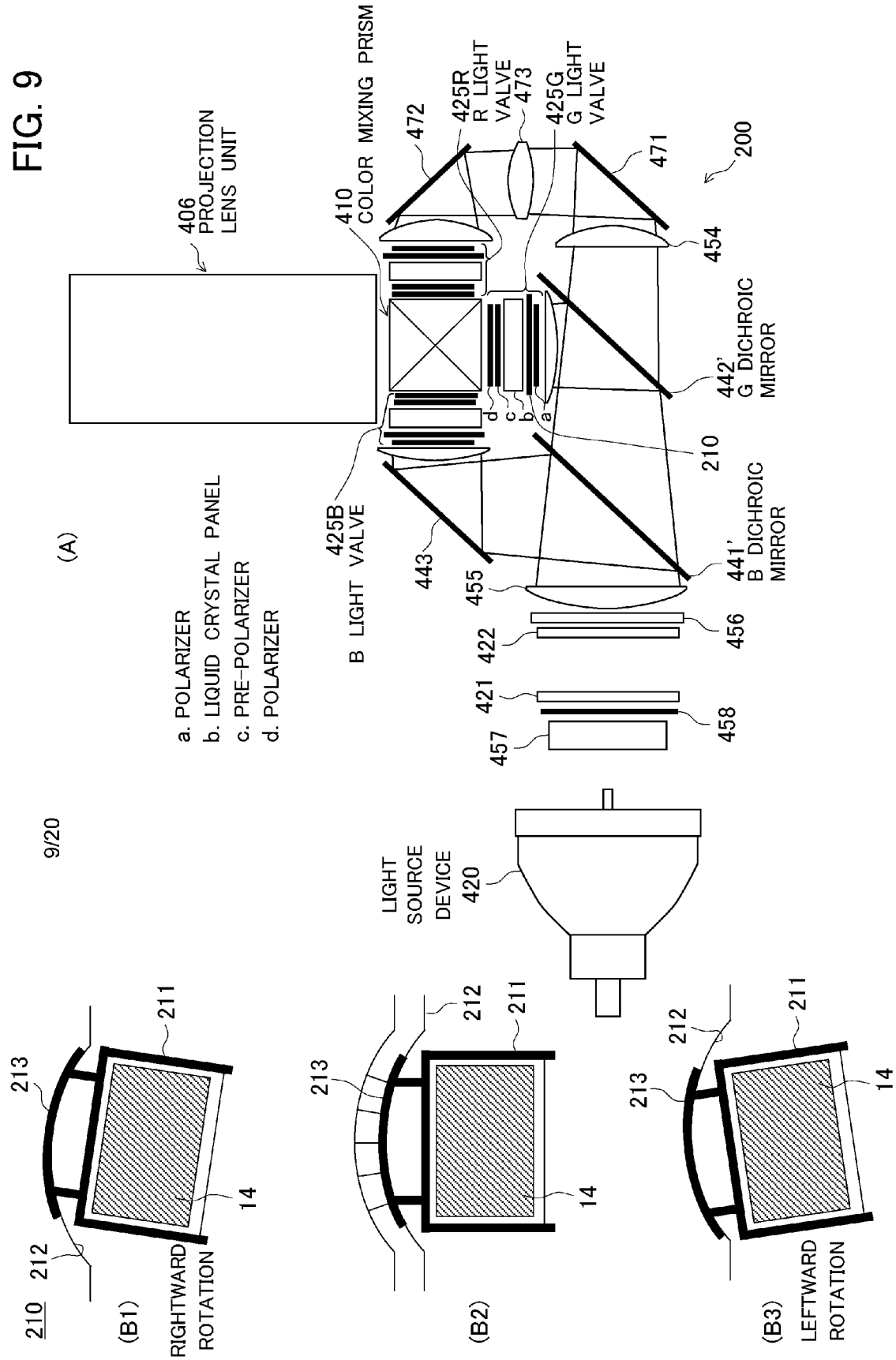
FIG. 9 A diagram for explaining an example of the configuration of a rotation mechanism according to the present embodiment.

In a projection system 200, as shown in FIG. 9, between a polarizer a on the incident side of a light valve, provided with an incident side polarizer a, a liquid crystal panel b, an emission side pre-polarizer c, and a polarizer d, and a liquid crystal panel b, a holder (rotation mechanism) 210 placed holding the optical compensator 14 is provided. A mechanism rotating that holder 210 is provided to enable evaluation of the relationship between rotation angles and black luminances. The configuration of the projection system 200 will be explained later.

The holder 210 has a body portion 211 holding the optical compensator 14 and a guided portion 213 formed at one end portion of the body portion 211 and guided by a guide portion 212 formed in an arc shape.

By making the guide portion 212 guide the guided portion 213, the body portion 211 rotates. Along with this, the optical compensator 14 rotates as well.

After rotating the optical compensator 14 by exactly a suitable angle by the rotation mechanism 210 having such a configuration (one example of the rotation mechanism 16 in FIG. 2), the compensator is fixed by a not shown fixing portion so that its position does not become deviated.

(First Optical Compensator 14-1)

Next, a first optical compensator 14-1 using two O-plates formed by hybrid aligned liquid crystal polymer is fabricated.

Figure 10:
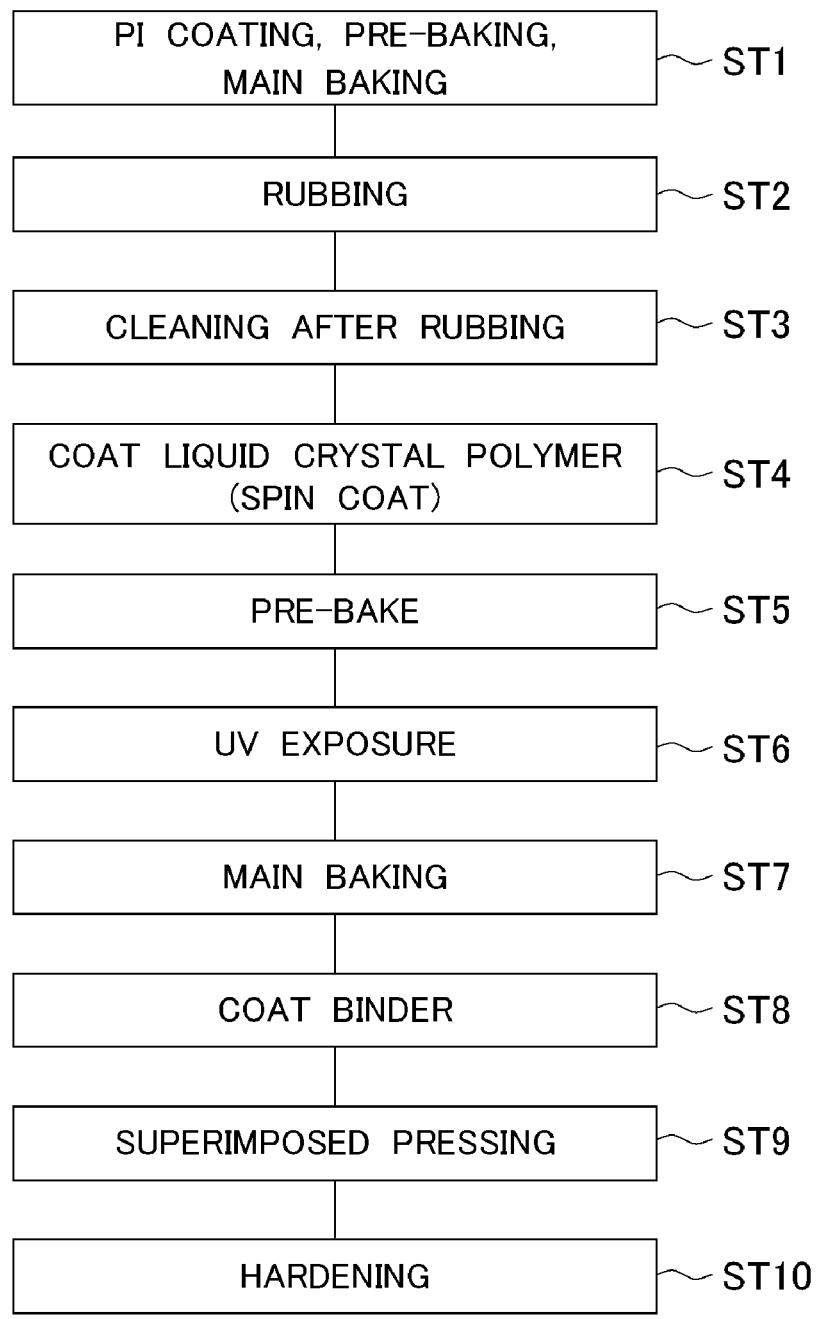
FIG. 10 A process chart of fabrication of a first optical compensator.

FIG. 10 is a process chart of the fabrication of the first optical compensator 141. Further, FIG. 11 shows the relationship between the tilt direction of the liquid crystal and the rubbing direction of the optical compensator.

An alignment film (PI) is coated on one glass substrate, pre-baked, and main baked (ST1). After that, rubbing is performed (ST2). The rubbing angle is determined so that the in-plane optical axis is set in a predetermined direction. The rubbing direction is a direction at 45° relative to the pretilt direction of the liquid crystal device. The rubbing is executed in a direction so that the two compensation layers configuring the optical compensator become approximately perpendicular to each other when bonded together.

At this time, as shown in FIGS. 11(A) and 11(B), two possibilities of the pattern 1 and pattern 2 may be considered. The optical axis direction of the compensation layer 1 of the pattern 1 and the optical axis direction of the compensation layer 2 of the pattern 2 are the same, while the optical axis direction of the compensation layer 2 of the pattern 1 and the optical axis direction of the compensation layer 1 of the pattern 2 are the same. For this reason, the effects of optical compensation when combining the two are substantially equal.

After rubbing, the layer is cleaned (ST3), a liquid crystal polymer is coated by the spin coating method (ST4), the layer with the liquid crystal (compensation layer) aligned is pre-baked (ST5), then UV is irradiated for UV exposure and main baking is performed for heat treatment to cause curing (ST6, ST7). At this time, the liquid crystal layer is hybrid aligned. At this time, the rotation speed of the spin coating may be changed to freely change the film thicknesses, that is, the phase difference values, of the two optical compensation layers. By arranging the two optical compensation layers close, preferably bonding them to each other, the optical compensator 14-1 is completed (ST8 to ST10).

An embodiment changing the retardation values of the two compensation layers by 10 nm and a comparative example having equal retardation values are fabricated. At this time, the mean values of the retardation values of the two compensation layers are made equal.

Next, the contrast is measured by using optical compensators and pre-polarizers having different left/right ratios of the present embodiment and a comparative example.

FIGS. 12(A) and 12(B) are diagrams showing relationships of rotation angles and black luminances when rotating this first optical compensator 14-1, in which FIG. 12(A) shows measurement results of the optical compensator 14-1 of the present embodiment, and FIG. 12(B) shows measurement results of the comparative example.

From these results, in the case of the comparative example, even when the optical compensator is rotated, the black luminance does not greatly fluctuate. The black luminance greatly varies depending on the left/right ratios of the pre-polarizers.

On the other hand, in the present embodiment, by rotating the first optical compensator 14-1 by for example the rotation mechanism 16 about the optical axis, the black luminance greatly fluctuates. The minimum values of the black luminances become substantially a constant value under all conditions of the left/right ratios of the pre-polarizers.

Further, when not providing the first optical compensator 14-1, the mean values of the black luminances of the right orientation and the left orientation were about 7(1×). However, by providing the first optical compensator 14-1, the minimum value of the black luminances is about 4(1×) under all conditions of the pre-polarizers. It is shown as well that there are effects of the optical compensation. It is seen from this result that by using the optical compensator 14-1 of the present embodiment, the pretilt component of the liquid crystal device is optically compensated, and axis deviations of the TAC films of the polarizers and pre-polarizer are corrected.

(Second Optical Compensator 14-2)

Next, a second optical compensator 14-2 using three O-plates formed by hybrid aligned liquid crystal polymer is fabricated.

Figure 13:
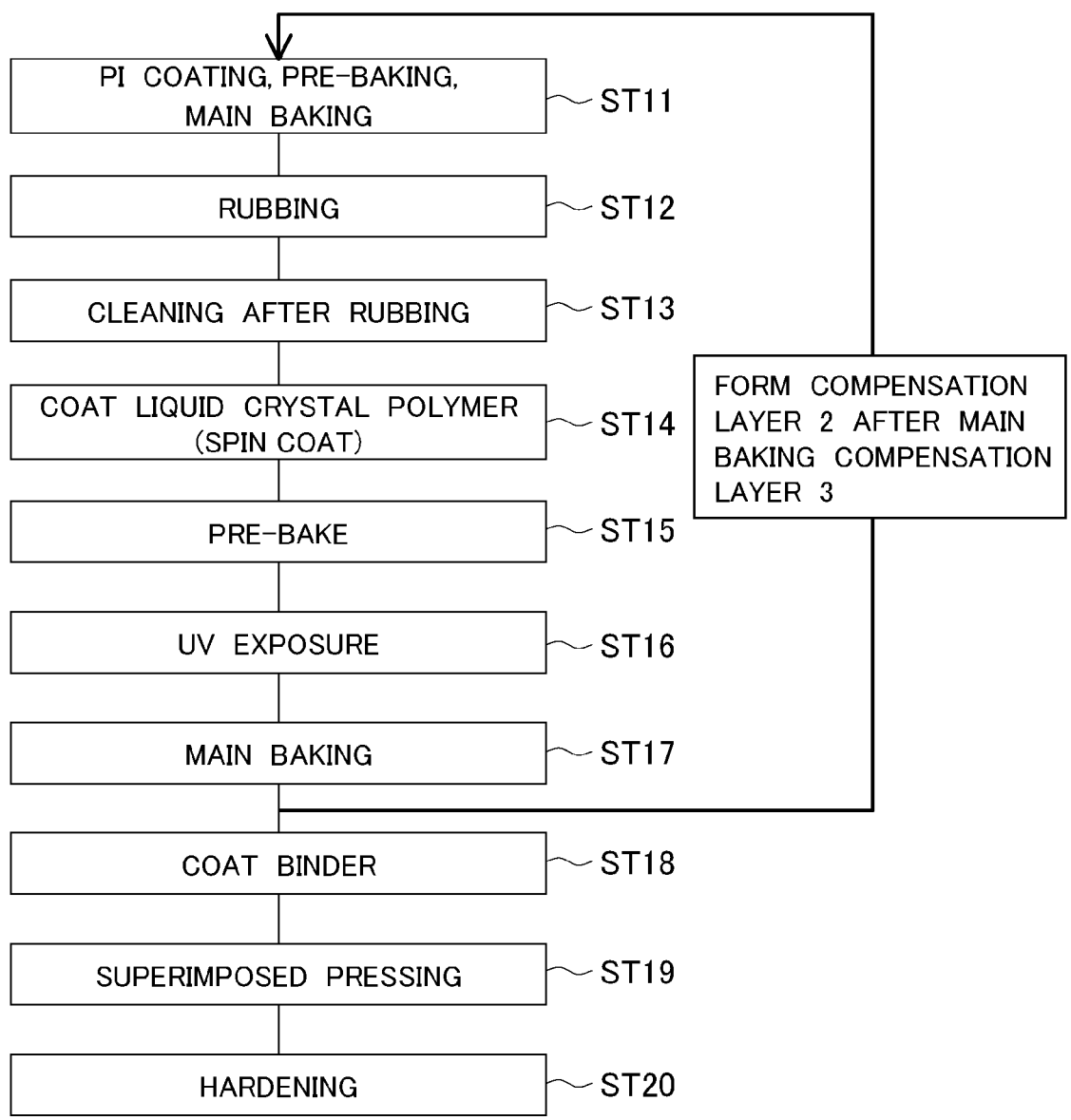
FIG. 13 A process chart of fabrication of a second optical compensator.
Figure 14:
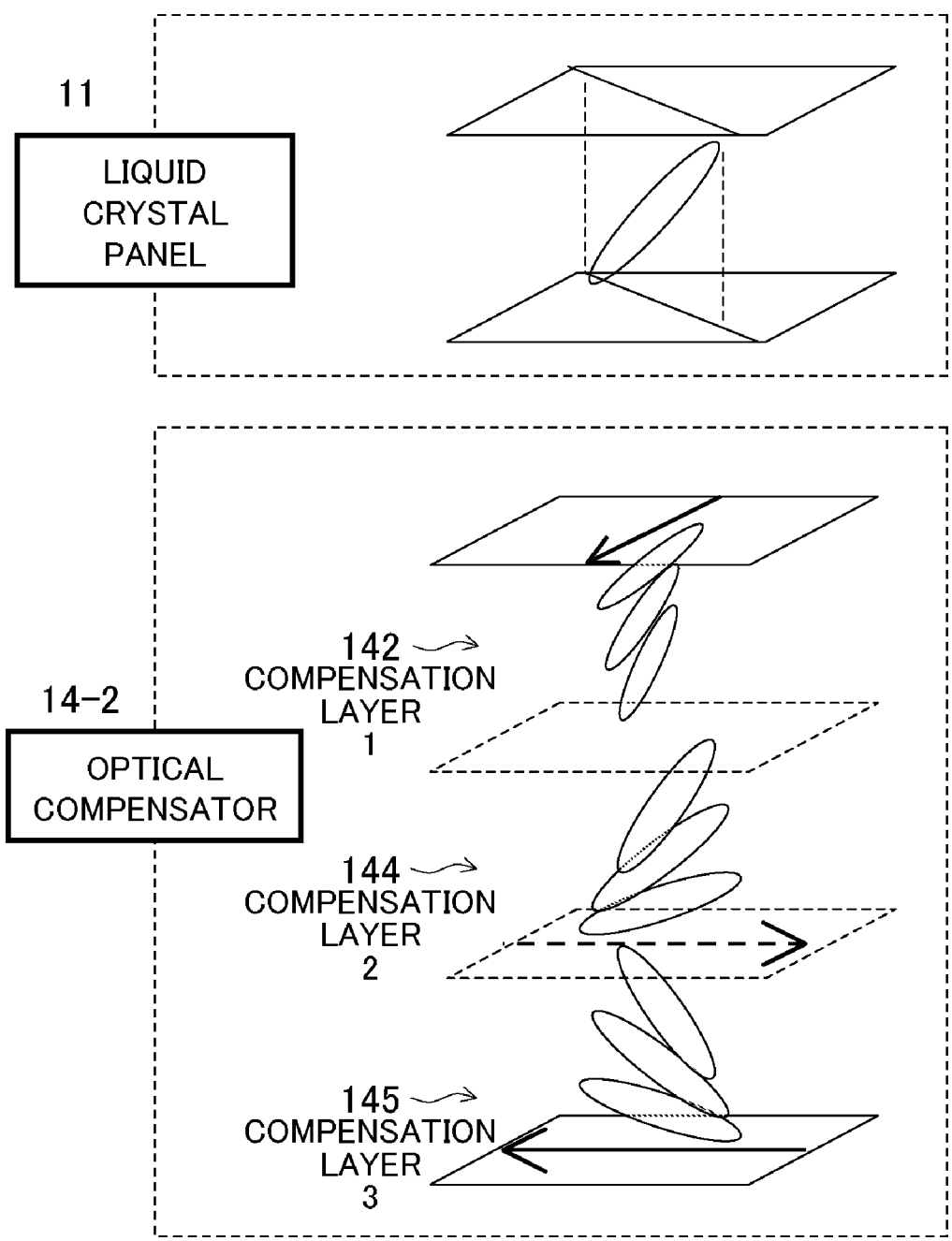
FIG. 14 A diagram showing the structure of the second optical compensator and relationships between the tilt direction of the liquid crystal and the rubbing direction of the optical compensator.

FIG. 13 shows a process chart of the fabrication of this second optical compensator, while FIG. 14 shows the structure of the second optical compensator 14-2 and the relationship between the tilt direction of the liquid crystal and the rubbing direction of the optical compensator.

An alignment film (PI) is coated on one glass substrate, pre-baked, and main baked (ST11). After that, rubbing is performed (ST12). The rubbing angle is determined so that the in-plane optical axis is set in a predetermined direction. The rubbing direction is a direction at 45° relative to the pretilt direction of the liquid crystal device. The rubbing is executed in a direction so that the three compensation layers configuring the optical compensator become approximately perpendicular or approximately parallel to each other when positioned in close proximity, preferably, when bonded together.

After rubbing, the layer is cleaned (ST13), a liquid crystal polymer is coated by the spin coating method (ST14), the layer with the liquid crystal (compensation layer) aligned is pre-baked (ST15), then UV is irradiated for UV exposure and main baking is performed for heat treatment to cause curing (ST16, ST17). At this time, the liquid crystal layer is hybrid aligned. At this time, the rotation speed of the spin coating may be changed to freely change the film thicknesses, that is, the phase difference values, of the three optical compensation layers.

In this way, the first compensation layer 142 and third compensation layer 145 are prepared.

On the third compensation layer 145, an alignment film is coated, pre-baked, and main baked. After that, rubbing is performed. The rubbing angle is determined so that the in-plane optical axis is set in a predetermined direction. The rubbing direction is a direction at 45° relative to the pretilt direction of the liquid crystal device. The rubbing is executed in a direction so that the compensation layers become approximately perpendicular or approximately parallel to each other when positioned in close proximity, preferably, when bonded together.

After the rubbing, the layer is cleaned, a liquid crystal polymer is coated by the spin coating method, the layer with the liquid crystal (compensation layer) aligned is pre-baked, then UV is irradiated for UV exposure or heat treatment is performed to cause curing. At this time, the liquid crystal layer is hybrid aligned. At this time, the rotation speed of the spin coating may be changed to freely change the film thicknesses of the optical compensation layers, that is, the phase difference values of the three optical compensation layers.

Due to this, the second compensation layer 144 was formed on the third compensation layer 145. By bonding these two optical compensators to each other, the optical compensator is completed (ST18 to ST20).

At this time, as the present embodiment, the difference between the sum of the phase differences between the second compensation layer 144 and third compensation layer 145 and the phase difference of the first compensation layer 142 is made 10 (nm).

This optical compensator 14-2 and pre-polarizers having different left/right ratios are used to measure the contrast.

Figure 15:
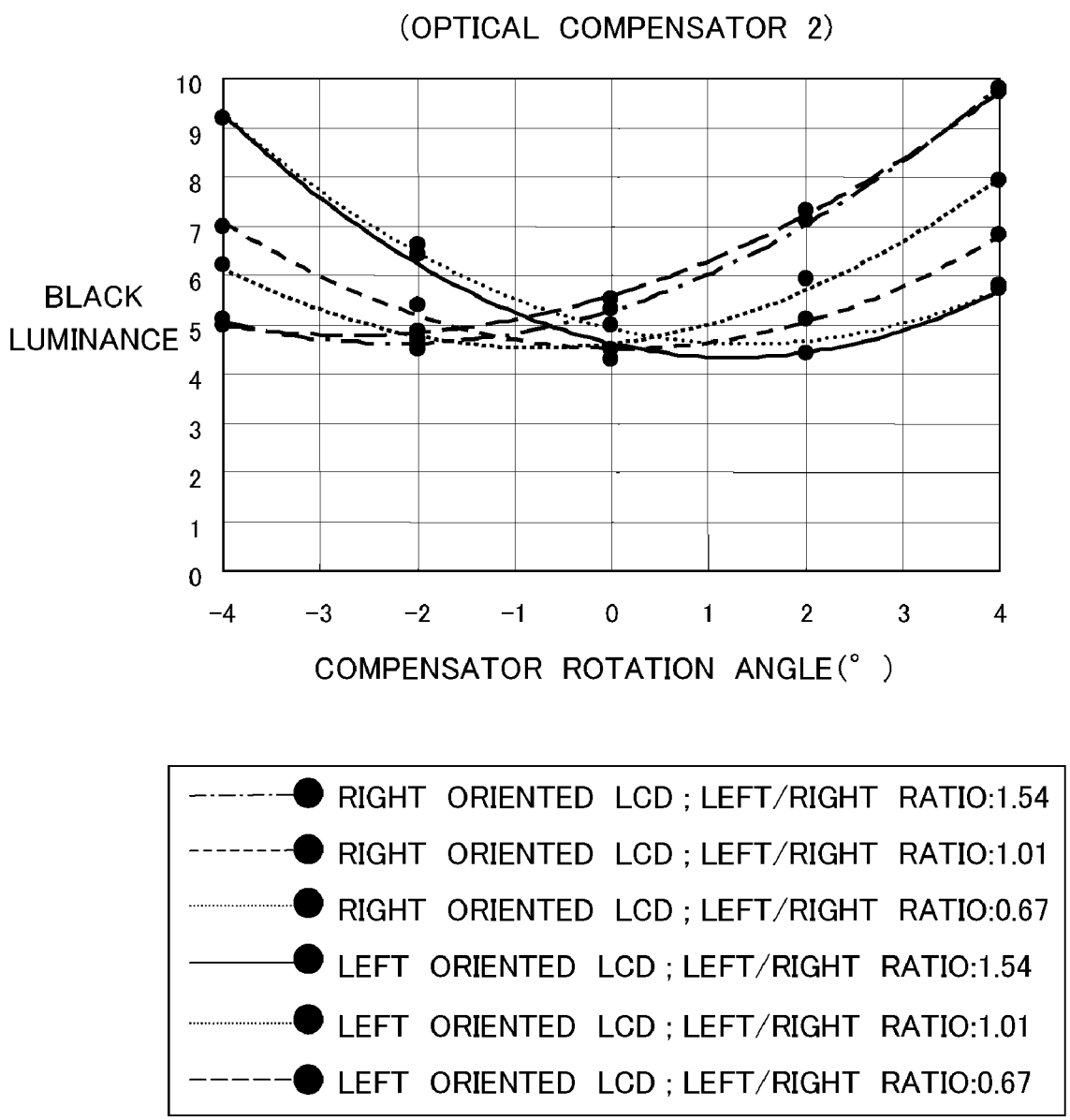
FIG. 15 A diagram showing relationships between rotation angles and black luminances when rotating the second optical compensator.

FIG. 15 is a diagram of contrast measurement results showing relationships of rotation angles and black luminances when rotating the second optical compensator about the optical axis using for example the rotation mechanism 16.

From these measurement results, by rotating the second optical compensator 14-2 about the optical axis, the black luminance greatly fluctuates. The minimum value of black luminances becomes a substantially constant value under all of the conditions of the left/right ratios of the pre-polarizers.

When not providing the optical compensator 14-2, the mean values of the black luminances of the right orientation and the left orientation were about 7(1×). However, by providing the second optical compensator 14-2, the minimum value of black luminances is about 4.5 (1×) under all conditions of the pre-polarizers. It is seen from this FIG. 15 that there are effects of optical compensation.

It is seen from this result that by using the second optical compensator 14-2 of the present embodiment, the pretilt component of the liquid crystal is optically compensated, and the axis deviations of the TAC films of the polarizers and pre-polarizer are corrected.

(Third Optical Compensator 14-3)

When the first optical compensator 14-1 and the second optical compensator 14-2 are rotated about the optical axes by using for example the rotation mechanism 16, the in-plane phase differences are optically compensated, but the phase differences in the thickness directions are insufficiently optically compensated.

Therefore, as a further preferred embodiment, in addition to the optical compensator 14-1, a negative C-plate having a predetermined phase difference value in the thickness direction is arranged as a third optical compensator 14-3.

In the negative C-plate, the refractive index in the thickness direction is lower than the in-plane refractive index.

FIG. 16 shows a refractive index ellipse of the negative C-plate. As the negative C-plate, for example a TAC film and a birefringent structure obtained by stacking thin films having refractive indexes which are greatly different such as $SiO_2$/$Nb_2O_5$ by vapor deposition, sputtering, or the like are known.

In the present embodiment, a base material of the pre-polarizer is formed with a negative C-plate by stacking $SiO_2$/$Nb_2O_5$ obtained by vapor deposition on the surface to which the pre-polarizer is not bonded.

Then, the negative C-plate is arranged on the liquid crystal panel side, that is, on the incidence side, and the pre-polarizer is arranged on the emission side.

A birefringent structure formed by inorganic materials having different refractive indexes is excellent in heat resistance and light resistance. Therefore, even when it is integrally formed with the pre-polarizer, problems of reliability and service life do not occur. After that, the optical compensator 1 is rotated, and the black luminance at that time is measured.

FIG. 17 is a diagram of contrast measurement results showing relationships of the rotation angles and black luminances when rotating this third optical compensator about the optical axis.

From these results, by combining the third optical compensator 14-3 with the first optical compensator 14-1, the variation of the contrasts can be reduced, and the contrast can be much enhanced.

When not providing the first optical compensator 14-1 and the third optical compensator 14-3, the mean values of the black luminances of the right orientation and the left orientation were about 7(1×). However, by providing the first optical compensator 14-1 and third optical compensator 14-3, the minimum value of the black luminances is about 2(1×) under all conditions of the pre-polarizers. This diagram shows that the third optical compensator 14-3 has effects of optical compensation as well.

(Fourth Optical Compensator 14-4)

An oblique vapor deposited inorganic film optically has characteristic features of an O-plate. Therefore, an O-plate can be prepared by oblique vapor deposition.

Two layers of oblique vapor deposited film are used to fabricate a fourth optical compensator 14-4. The vapor deposition angle is kept constant as it is, and the vapor deposition is carried out with an orientation at 45° with respect to the tilt orientation of the liquid crystal and with an orientation whereby the vapor deposition orientations of the two layers are substantially perpendicular to each other.

FIG. 18 shows the structure of the fourth optical compensator 14-4 and the vapor deposition direction.

By changing the film thicknesses of the two compensation layers at that time, the phase difference values are changed. The difference of the phase differences between the two compensation layers is set at 10 nm.

Next, by using the fourth optical compensator 14-4 and pre-polarizers having different left/right ratios, the contrast is measured.

Figure 19:
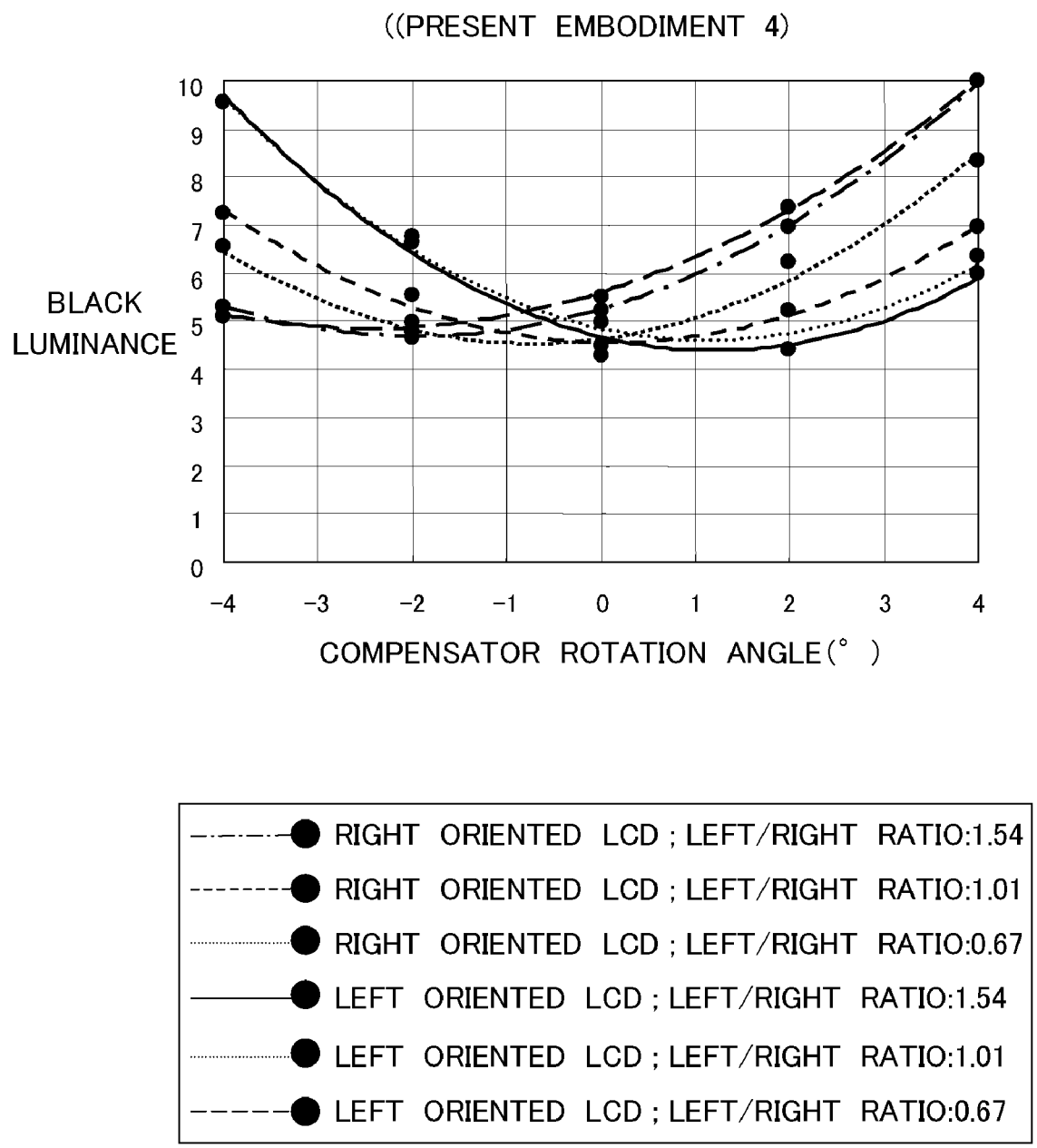
FIG. 19 A diagram showing relationships between rotation angles and black luminances when rotating the fourth optical compensator.

FIG. 19 shows the relationships of rotation angles and black luminances when rotating this fourth optical compensator about the optical axis by using for example the rotation mechanism 16.

In the case of the comparative example illustrated in FIG. 12(B), even when the optical compensator is rotated about the optical axis, the black luminance does not greatly fluctuate. The black luminance greatly varies according to the left/right ratios of the pre-polarizers.

On the other hand, in the present embodiment, by rotating the fourth optical compensator 14-4, the black luminance greatly fluctuates. The minimum value of black luminances becomes a substantially constant value under all of the conditions of the left/right ratios of the pre-polarizers.

When not providing the fourth optical compensator, the mean values of the black luminances of the right orientation and the left orientation were about 7(1×). However, by providing the fourth optical compensator 14-4, the minimum value of the black luminances is about 5 (1×) under all conditions of the pre-polarizers. This FIG. 19 shows that there are effects of optical compensation as well.

It is seen from this result that by using the fourth optical compensator 14-4 of the present embodiment, the pretilt component of the liquid crystal is optically compensated, and axis deviations of the TAC films of the polarizers and pre-polarizers are corrected.

As explained above, according to the optical compensator of the present embodiment, it becomes possible to realize prolongation of the service life of the display system without increasing the number of parts and correct the in-plane phase differences of the TAC films of the polarizers and pre-polarizers.

By changing the phase difference values of two or more O-plates obtained by bonding two or more optical compensation layers to each other, an in-plane phase difference is generated when considering the optical compensator in total. Accordingly, by rotating the optical compensator, it becomes possible to change the phase difference value about the optical axis. By setting the rotation angle of the optical compensator to an angle that cancels the phase differences of the TAC films, it becomes possible to correct the optical axis deviations of the TAC films.

Further, by rotating the optical compensator, it also becomes possible to correct deviations from design values of the liquid crystal panel and optical compensator.

Next, the configuration of a projection type liquid crystal display system as an example of an electronic apparatus using the liquid crystal display device described before will be explained with reference to the schematic view of the configuration of FIG. 20.

Figure 20:
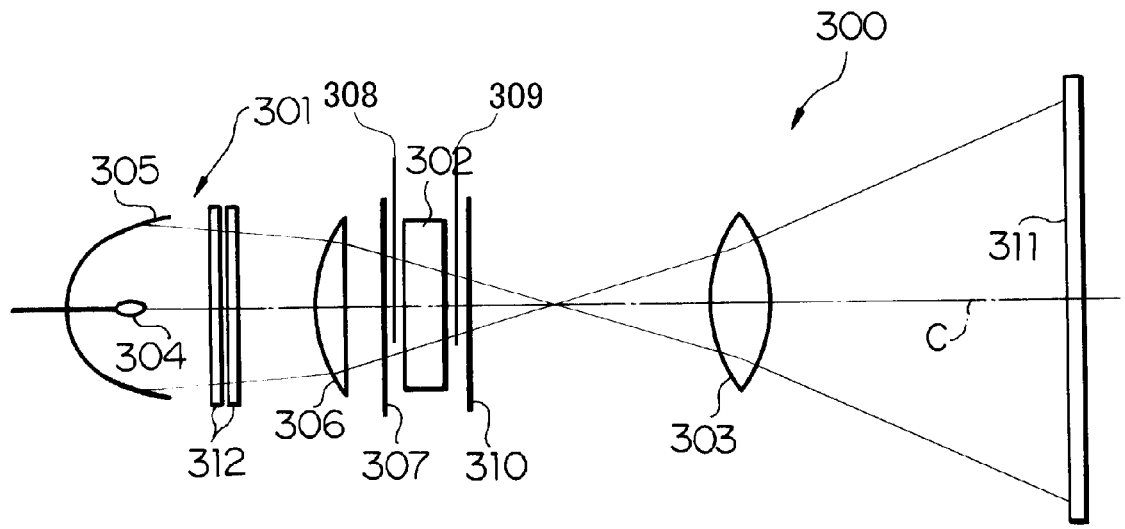
FIG. 20 A diagram schematically showing an example of the configuration of a projection type liquid crystal display device according to the present embodiment.

As shown in FIG. 20, a projection type liquid crystal display system (liquid crystal projector) 300 is configured by a light source 301, a transmission type liquid crystal device 302, and a projection optical system 303 sequentially arranged along an optical axis C.

Light emitted from a lamp 304 constituting the light source 301 is made incident upon a condenser lens 306 while the component emitted to the rear of the light source 301 is reflected forward by a reflector 305. The condenser lens 306 further condenses the light and guides it via an incident side polarizer 307 and an optical compensator 308 to the liquid crystal device 302.

The light guided to the liquid crystal device is converted to an image by the liquid crystal device 302 having the function of a shutter or light valve, a pre-polarizer 309, and an emission side polarizer 310. The displayed image is projected enlarged onto a screen 311 via the projection optical system 303.

Note that a filter 312 is inserted between the light source 301 and the condenser lens 306. The filter 312 eliminates light having an unnecessary wavelength included in the light source, for example, infrared-rays and UV rays.

Note that, for the liquid crystal device 302, incident side polarizer 307, optical compensator 308, pre-polarizer 309, and emission side polarizer 310, it is possible to apply the liquid crystal display device according to the embodiments explained above.

Next, the configuration of a projection liquid crystal display system of another example of an electronic apparatus using a liquid crystal device explained before will be explained with reference to FIG. 21.

Figure 21:
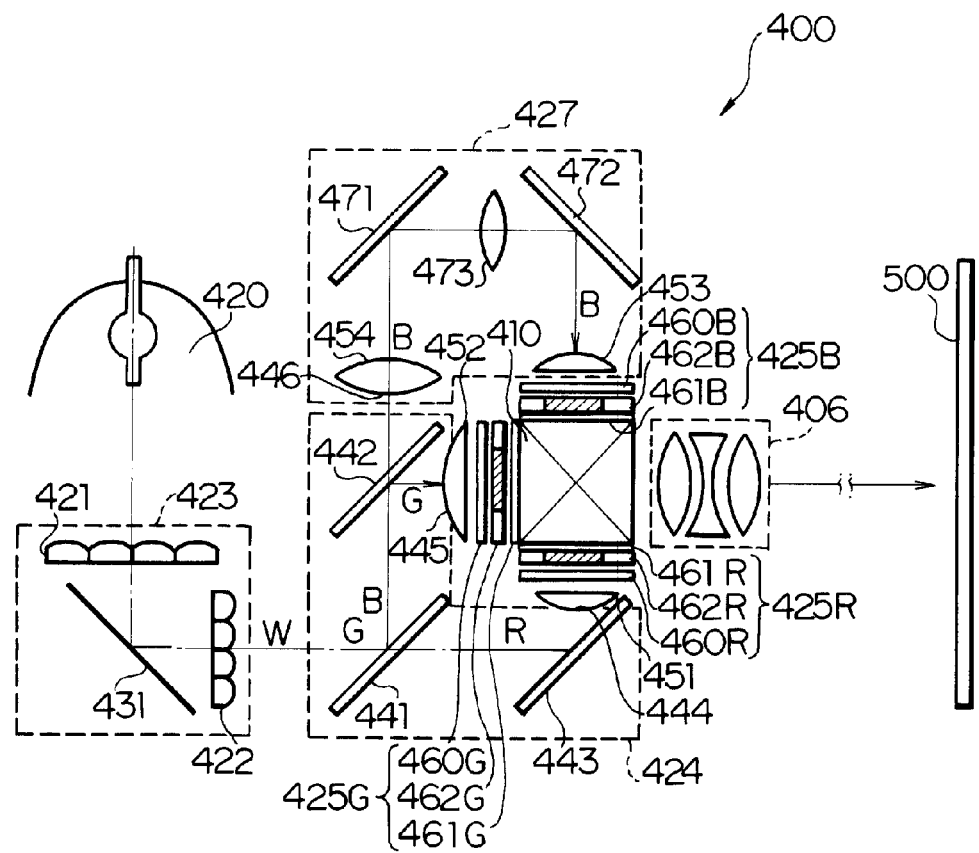
FIG. 21 A diagram showing a further concrete example of the configuration of a three-plate type projection type liquid crystal display system according to the present embodiment.

A projection type liquid crystal display system 400 shown in FIG. 21 uses three of the liquid crystal display systems explained above. The three liquid crystal display systems are used as RGB use liquid crystal display systems 462R, 462G, and 462B. The figure is a schematic view of the configuration of the optical system of a projection type liquid crystal display system.

For these liquid crystal display systems 462R, 462G, and 462B, it is possible to apply the liquid crystal display system according to the embodiment explained above including the liquid crystal device 11, incident side polarizer 12, optical compensator 14, pre-polarizer 15, and emission side polarizer 13 according to the embodiment explained with reference to FIG. 2 to FIG. 19.

In the projection type liquid crystal display system 400, as the optical system, use is made of a light source system 420 and a uniform illumination optical system 423.

There is provided a color separation optical system 424 as a color separating means for separating a light beam W emitted from this uniform illumination optical system 423 to red (R), green (G), and blue (B), three light valves 425R, 425G, and 425B as modulating means for modulating light beams R, G, and B of these different colors, a color mixing prism 410 as a color mixing means for mixing light beams of different colors after the modulation, a projection lens unit 406 as a projecting means for projecting enlarged the mixed light beams to the surface of a projection surface 500, and a projection type liquid crystal display system 400. Further, the projection type liquid crystal system device 400 is provided with a light guide system 427 for guiding the blue light beam B to a corresponding light valve 725B.

The uniform illumination optical system 423 is provided with two lens plates 421 and 422 and a reflection mirror 431. The two lens plates 421 and 422 are arranged in a crossing state while sandwiching the reflection mirror 431 therebetween. Each of the two lens plates 421 and 422 of the uniform illumination optical system 423 is provided with a plurality of rectangular lenses which are arranged in a matrix shape.

A light beam emitted from the light source system 420 is split into a plurality of partial light beams by the rectangular lenses of the first lens plate 421. Then, these partial light beams are superimposed on each other near the three light valves 425R, 425G, and 425B by the rectangular lenses of the second lens plate 422.

Accordingly, by using the uniform illumination optical system 423, even when the light source system 420 has an uneven illuminance distribution within a cross-section of a luminance flux of the emitted light, it becomes possible to illuminate the three light valves 425R, 425G, and 425B by uniform illumination beams.

The color separation optical system 424 is configured by a blue-green reflection dichroic mirror 441, a green reflection dichroic mirror 422, and a reflection mirror 443.

First, in the blue-green reflection dichroic mirror 441, the blue light beam B and green light beam G included in the light beam W are reflected at a right angle and go toward the sides of the green reflection dichroic mirror 442. The red light beam R passes through the blue-green reflection dichroic mirror 441, is reflected at a right angle at the backward reflection mirror 443, and is emitted from an emission portion 444 of the red light beam R to the sides of the color mixing prism 410.

Next, in the green reflection dichroic mirror 442, between the blue light beam B and green light beam G reflected at the blue-green reflection dichroic mirror 441, only the green light beam G is reflected at a right angle and emitted from an emission portion 445 of the green light beam G to the sides of the color mixing optical system. The blue color beam B passed through the green reflection dichroic mirror 442 is emitted from an emission portion 446 of the blue light beam B to the sides of the light guide system 427.

Note that, here, the distances from the emission portion of the light beam W of the uniform illumination optical system 423 up to the emission portions 444, 445, and 446 of the color light beams in the color separation optical system 424 are set to become substantially equal. On each emission side of the emission portion 444 of the red light beam R and the emission portion 445 of the green light beam G in the color separation optical system 424, a focus lens 451 and a focus lens 452 are arranged. Accordingly, the red light beam R and green light beam G emitted from the emission portions are incident upon the focus lenses 451 and focus lens 452 and changed to parallel beams.

The red light beam R and green light beam G changed to parallel beams in this way are incident upon the light valve 425R and light valve 425G and modulated, whereby image information corresponding to the color beams are added.

Namely, these liquid crystal devices are switched in accordance with the image information by a not shown driving means. Due to this, the color beams passing through the liquid crystal elements of the liquid crystal devices are modulated. On the other hand, the blue color beam B is guided to the corresponding light valve 425B via the light guide system 427, where it is modulated in accordance with the image information in the same way.

Note that the light valves 425R, 425G, and 425B of the present embodiment are liquid crystal light valves further configured by incident side polarizers 461R, 461G, and 461B and liquid crystal display devices 462R, 462G, and 462B arranged among these.

The light guide system 427 is configured by a focus lens 454 arranged on the emission side of the emission portion 446 of blue light beam B, an incident side reflection mirror 471, an emission side reflection mirror 472, an intermediate lens 473 arranged between these reflection mirrors, and a focus lens 453 arranged at the front side of the light valve 425B.

The light beam of the blue color emitted from the focus lens 446 is guided to the liquid crystal device 462B via the light guide system 727 and modulated. Among the light path lengths of the different colors of the light beams, that is, the distances from the emission portion of the light beam W up to the liquid crystal display devices 462R, 462G, and 462B, the light path of the blue light beam B becomes the longest. Accordingly, the loss of light of the blue light beam becomes the largest.

However, by interposing the light guide system 427, the loss of light can be suppressed. The light beams R, G, and B of colors modulated after passing through the light valves 425R, 425G, and 425B are made incident upon the color mixing prism 410 and mixed there. Then, the light mixed by the color mixing prism 410 is projected enlarged onto the surface of the projection surface 500 located at a predetermined position via the projection lens unit 406.

Note that, in the projection system 200 in FIG. 9, the light generated from the light source system 420 is split into parallel beams at a concave lens or other optical part 457. These pass through evening means configured by two lens plates 421 and 422 via a UV ray cutting filter 458 and are made approximately the same in their polarization directions by a polarization conversion element 456. The light output from the polarization conversion element 456 is separated in color by a B dichroic mirror 441' reflecting the blue light and passing the green light and red light via a focus lens 455. Further, the system is configured to separate in color the green light and red light passed through the B dichroic mirror 441' by a G dichroic mirror 442' reflecting the green light and passing the red light therethrough. In the present embodiment, the projection system 200 shown in FIG. 9 and the projection type liquid crystal display system 400 shown in FIG. 21 differ in arrangements of the light valves 425B and light valves 425R, but components indicated by the same notations as those of FIG. 21 other than the above components have the same functions as those in the projection type liquid crystal display system 400, so explanations will be omitted.

Note that even when applying the optical compensator of the present invention to not only a liquid crystal display system, but also any other type of display system such as a reflection type liquid crystal display system, LCOS, and organic EL, the effects explained above are obtained.

Further, even when applying the optical compensator of the present invention to any type of liquid crystal display system such a built-in drive circuit type liquid crystal display system, a type of liquid crystal display system where the drive circuit is externally attached, liquid crystal display systems having a variety of sizes of 1 inch to 15 inches or more, a simple matrix system, a TFD active matrix system, a passive matrix drive system, an optical rotation mode, and a birefringence mode, the effects explained above were obtained.

The invention claimed is:

1. A liquid crystal display system comprising:
a liquid crystal device configured to optically modulate a light beam emitted through a liquid crystal layer with vertically aligning liquid crystal molecules which have a negative dielectric constant anisotropy and have a pretilt with respect to a direction vertical to a main surface of a substrate of the liquid crystal device;
a first polarizer arranged on a light incident side of the liquid crystal device;
a second polarizer arranged on a light emission side of the liquid crystal device;
a pre-polarizer arranged between the light emission side of the liquid crystal device and a light incident side of the second polarizer;
an optical compensator arranged in a light path between a light emission side of the first polarizer and the light incident side of the second polarizer; and
a rotation portion to rotate the optical compensator and capable of rotating the optical compensator in the plane of the optical compensator,
wherein,
the optical compensator has at least two compensation layers arranged so that surfaces of the layers face each other,
the at least two compensation layers are positioned so that values of phase differences of the compensation layers and directions of optical axes, corresponding to slow axes or fast axes of materials forming the compensation layers, in the planes of the surfaces of the layers, are different from each other,
each of the first polarizer, the second polarizer, and the pre-polarizer includes a triacetyl cellulose (TAC) film having a phase difference in the plane through which light passes, and
an angle of rotation of the optical compensator is set such as to cancel the phase differences of the TAC films of the first and second polarizers and the pre-polarizer.

2. A liquid crystal display system as set forth in claim 1, wherein
the at least two optical compensation layers are arranged in the light path between the emission side of the first polarizer and the incident side of the liquid crystal device.

3. A liquid crystal display system as set forth in claim 1, wherein each of the at least two compensation layers is formed by an O-plate which is formed by hybrid alignment of a liquid crystal polymer and in which an optical axis is in an oblique direction relative to a layer surface.

4. A liquid crystal display system as set forth in claim 1, wherein each of the at least two compensation layers is formed by an O-plate which is formed by an oblique vapor deposition and in which an optical axis is located in an oblique direction relative to a layer surface.

5. A liquid crystal display system as set forth in claim 3, further comprising a C-plate having a lower refractive index in a thickness direction compared with a refractive index of a layer surface.

6. A liquid crystal display system as set forth in claim 4, further comprising a C-plate having a lower refractive index in a thickness direction compared with a refractive index of a layer surface.

7. A projection type liquid crystal display system comprising:
a light source;
an illumination optical system making a light beam emitted from the light source converge to a required light path;
a liquid crystal device that optically modulates the light beam from the illumination optical system by means of a liquid crystal layer with vertically aligning liquid crystal molecules which have a negative dielectric constant anisotropy and have a pretilt in the direction vertical to a main surface of a substrate of the liquid crystal device;
a projection optical system that enlarges and projects the light beam optically modulated by the liquid crystal device;
a first polarizer arranged on a light incident side of the liquid crystal device;
a second polarizer arranged on a light emission side of the liquid crystal device;
a pre-polarizer arranged between the light emission side of the liquid crystal device and a light incident side of the second polarizer;
an optical compensator arranged between the light emission side of the first polarizer and the light incident side of the second polarizer; and
a rotation portion to rotate the optical compensator and capable of rotating the optical compensator about an optical axis,
wherein,
the optical compensator comprises at least two compensation layers arranged so that surfaces of the layers face each other,
the at least two compensation layers are positioned so that values of phase differences of the compensation layers and directions of optical axes, corresponding to slow axes or fast axes of materials forming the compensation layers, in the planes of the surfaces of the layers, are different from each other,
each of the first polarizer, the second polarizer, and the pre-polarizer includes a triacetyl cellulose (TAC) film having a phase difference in the plane through which light passes, and
an angle of rotation of the optical compensator is set such as to cancel the phase differences of the TAC films of the first and second polarizers and the pre-polarizer.

8. A projection type liquid crystal system as set forth in claim 7, wherein the pre-polarizer, arranged between the liquid crystal device and the second polarizer, transmits light in substantially the same polarization direction as the second polarizer.

9. A method for producing a display system which comprises (a) a liquid crystal device that optically modulates a light beam by means of a liquid crystal layer with vertically aligning liquid crystal molecules having a negative dielectric constant anisotropy and having a pretilt in a direction vertical to a main surface of a substrate of the liquid crystal device, (b) a first polarizer arranged on a light incident side of the liquid crystal device, (c) a second polarizer arranged on a light emission side of the liquid crystal device, (d) a pre-polarizer arranged between the light emission side of the liquid crystal device and a light incident side of the second polarizer, (e) an optical compensator including at least two compensation layers arranged so that surfaces of the layers face each other, and (f) a rotation portion to rotate the optical compensator and capable of rotating the optical compensator about an optical axis, wherein each of the first polarizer, the second polarizer, and the pre-polarizer includes a triacetyl cellulose (TAC) film having a phase difference in the plane through which light passes, said method comprising the steps of:

forming the optical compensator by positioning the at least two compensation layers so that values of phase differences of the compensation layers and directions of optical axes, corresponding to slow axes or fast axes of materials forming the compensation layers, in the planes of the surfaces of the layers, are different from each other;

arranging the optical compensator in a light path between a light emission side of the first polarizer and the light incident side of the second polarizer; and setting an angle of rotation of the optical compensator such as to cancel the phase differences of the TAC films of the first and second polarizers and the pre-polarizer.

10. The method of claim 9, wherein each of the at least two compensation layers is formed by an O-plate formed by hybrid aligning a liquid crystal polymer and having an optical axis located in an oblique direction relative to a layer surface.

11. The method of claim 9, wherein each of the at least two compensation layers is formed by an O-plate formed by oblique vapor deposition and having an optical axis located in an oblique direction relative to a layer surface.

12. The method of claim 9, wherein the at least two compensation layers differ in their film thicknesses.

* * * * *